(12) United States Patent
Murakami et al.

(10) Patent No.: US 7,638,163 B2
(45) Date of Patent: Dec. 29, 2009

(54) METHOD FOR FORMING ANTI-GLARE LAYER AND ANTI-GLARE FILM, AND INK-JET APPARATUS FOR FORMING ANTI-GLARE LAYER

(75) Inventors: Takashi Murakami, Hachioji (JP); Sota Kawakami, Shiroyama-machi (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1007 days.

(21) Appl. No.: 10/695,616

(22) Filed: Oct. 28, 2003

(65) Prior Publication Data

US 2004/0091642 A1    May 13, 2004

(30) Foreign Application Priority Data

Nov. 1, 2002    (JP) .............. 2002-319665

(51) Int. Cl.
*B05D 5/02* (2006.01)
(52) U.S. Cl. ..................... 427/164; 427/165
(58) Field of Classification Search .......... 427/164, 427/165
See application file for complete search history.

(56) References Cited

U.S. PATENT DOCUMENTS

| | | | | |
|---|---|---|---|---|
| 4,040,727 A | * | 8/1977 | Ketchpel | .......... 349/114 |
| 4,575,730 A | * | 3/1986 | Logan et al. | .......... 347/9 |
| 5,998,013 A | * | 12/1999 | Shoshi et al. | .......... 428/331 |
| 6,398,371 B1 | * | 6/2002 | Matsunaga et al. | .......... 359/614 |
| 6,419,366 B1 | * | 7/2002 | Namioka | .......... 359/601 |
| 6,533,852 B2 | * | 3/2003 | Hirose | .......... 106/31.48 |
| 6,545,422 B1 | * | 4/2003 | George et al. | .......... 315/169.3 |
| 6,964,815 B2 | * | 11/2005 | Yoshitake et al. | .......... 428/446 |
| 2002/0034008 A1 | * | 3/2002 | Ohishi et al. | .......... 359/493 |

FOREIGN PATENT DOCUMENTS

| | | |
|---|---|---|
| JP | 06018706 | 1/1994 |
| JP | 07066530 | 3/1995 |
| JP | 11119001 | 4/1998 |
| JP | 10180950 | 7/1998 |
| JP | 11109111 | 4/1999 |
| JP | 2000035508 | 2/2000 |
| JP | 2002022952 | 1/2002 |
| JP | 2001033606 | 2/2002 |
| JP | 2002120311 | 4/2002 |
| JP | 2002311204 | 10/2002 |
| WO | 0067051 | 11/2000 |
| WO | WO02/064524 | * 8/2002 |
| WO | 02075706 | 9/2002 |

\* cited by examiner

*Primary Examiner*—Michael Cleveland
*Assistant Examiner*—Robert Vetere
(74) *Attorney, Agent, or Firm*—Lucas & Mercanti, LLP

(57) ABSTRACT

A method for forming an anti-glare layer, including the step of: ejecting droplets of an ink with an ink-jet apparatus onto a transparent substrate so as to form a microscopically roughened structure on the transparent substrate, wherein the ink contains an ingredient capable of giving an anti-glare property to the transparent substrate.

18 Claims, 7 Drawing Sheets

METHOD FOR FORMING ANTI-GLARE LAYER AND ANTI-GLARE FILM, AND INK-JET APPARATUS FOR FORMING ANTI-GLARE LAYER

TECHNICAL FIELD

The present invention relates to a forming method of an anti-glare layer which exhibits an excellent anti-glare function, a production method of an anti-glare film, and an ink-jet apparatus for forming an anti-glare layer.

BACKGROUND

In recent years, thin and light weight laptop computers have increasingly been developed. Along with such development, a decrease in thickness as well as enhancement in quality of the protective film of polarizing plates, which are employed in the display apparatuses such as a liquid crystal display apparatus, has increasingly been demanded. Further, liquid crystal image display apparatuses (also called liquid crystal displays) of computers as well as word processors have increasingly been employed in which a reflection minimizing layer is provided to enhance visibility, undesired image capturing is minimized, and in order to achieve display performance of minimizing glare, an anti-glare layer is provided in which the layer surface is roughened.

Various types of anti-reflection layers as well anti-glare layers have been developed depending on their need, and their performance has been improved. In order to enhance visibility, methods are employed in which reflection minimizing function or anti-glare function is achieved by providing various films exhibiting improved performance in front of the liquid display. In an optical film employed as a front plate, provided is a reflection minimizing layer or an anti-glare layer which is formed by coating or sputtering.

The aforesaid anti-glare layer functions as follows. By blurring an image contour reflected on the surface, the visibility of reflected images is degraded. By such action, during the use of an image display apparatus such as a liquid crystal display, an organic EL display, or a plasma display, reflection image capturing becomes almost unnoticeable.

By appropriately roughening the surface, it is possible to provide such properties. Heretofore, disclosed as a method to form such surface roughness has been a method in which minute particles are incorporated into a liquid coating composition (e.g., refer to Patent Document 1). Other than this, known are an embossing method disclosed in JP-A No. 6-234175, and a method disclosed in JP-A No. 63-298201 in which a pattern is previously transferred. However, the embossing method and the method in which roughness is formed by transfer result in low productivity and particularly result in extreme difficulty to form a microscopically roughened structure.

On the other hand, employed as a method to form roughness by using fine particles is a method in which a liquid coating composition is prepared by dispersing minute particles such as minute inorganic or organic particles in binders such as resins and coated, whereby an roughened structure is formed. In this method, minute particles which form roughness are incorporated into a binder layer, wherein it is required to suitably disperse minute particles. As a result, it is difficult to effectively form a desired roughened structure. As a result, problems occur in which it is difficult to result in sufficient anti-glare effects required of the anti-glare film. In addition, when the pattern of roughness is varied, it is necessary to alter the diameter of minute particles, the blending amount, and the layer thickness, whereby conversion of the type of products becomes very complex. Further, in order to form the desired roughened structure, it becomes necessary to use particles of a relatively large diameter, whereby sharpness is degraded. Still further, in the method in which an anti-glare layer is formed employing the aforesaid coating, coating mottle often forms and adhesion to the support or a lower layer is degraded, and further, productivity is also degraded. Accordingly, it has been desired to urgently develop improvement means.

On the other hand, known as one of the methods to form a functional layer is a method in which after applying a liquid coating composition, comprising actinic radiation curable resins or heat curable resins together with various types of minute particles, onto a substrate, curing is performed by irradiation of actinic radiation or thermal processing (e.g., refer to Patents Documents 2-4). However, when an anti-glare layer is formed by coating while employing actinic radiation curable resins or heat curable resins, in order to effectively form the desired roughened structure, in the same manner as above, it is necessary to appropriately control the liquid coating composition as well as coating conditions, whereby the amount of work increases during conversion of product types and productivity is lowered due to the production of numerous types of products.

Still further, in order to improve visibility, heretofore, provided was an anti-glare layer or a reflection minimizing layer on the surface of display apparatuses. Along with the conversion of display apparatuses to color as well as to higher resolution, an anti-glare film is sought which exhibits excellent visibility.

(Patent Document 1)
  Japanese Patent Publication Open to Public Inspection (hereafter, it is called as JP-A) No. 59-58036 (claims)

(Patent Document 2)
  JP-A No. 2001-310912 (claims)

(Patent Document 3)
  JP-A No. 2002-114928 (claims)

(Patent Document 4)
  JP-A No. 2002-120311 (claims)

SUMMARY

An objective of the present invention is to provide a method for forming an anti-glare layer which exhibits excellent film physical properties (film uniformity as well as adhesion property, results in excellent anti-glare effect, exhibits excellent sharpness, visibility, and desired solid black when displaying animation, an anti-glare film and a production method of the same, and an anti-glare layer forming ink-jet apparatus.

The aforesaid objective of the present invention is achieved employing the embodiments described below.

1. An anti-glare layer forming method wherein by ejecting ink droplets comprising an anti-glare property providing composition, which forms a microscopically roughened structure, onto a transparent substrate, employing an ink-jet system, an anti-glare layer of a microscopically roughened structure is formed on the surface of the aforesaid substrate.
2. The anti-glare layer forming method, described in 1. above, wherein the center line mean roughness (Ra) of the aforesaid microscopically roughened structure is 0.05-5.0 μm.
3. The anti-glare layer forming method, described in 1. or 2 above, wherein the aforesaid microscopically roughened structure comprises 1-50 peaks having a height (a) of 0.5-

10 μm per 100 μm², while the aforesaid height (a) is determined employing the bottom of the valley as a standard.
4. The anti-glare layer forming method, described in any one of 1.-3. above, wherein the aforesaid anti-glare property providing composition is an actinic radiation curable resin.
5. The anti-glare layer forming method, described in any one of 1.-3. above, wherein actinic radiation is exposed immediately after deposition of the aforesaid ink droplets onto a transparent substrate.
6. The anti-glare layer forming method, described in any one of 1.-3. above, wherein the aforesaid anti-glare property providing composition is a heat curable resin.
7. The anti-glare layer forming method, described in 6. above, wherein heat curing is performed immediately after deposition of the aforesaid ink droplets onto a transparent substrate.
8. The anti-glare layer forming method, described in any one of 1.-7. above, wherein by ejecting at least two types of ink droplets of different compositions, roughness of different refractive index is formed.
9. The anti-glare layer forming method, described in any one of 1.-8. above, wherein by ejecting at least two types of ink droplets of different particle diameter, the aforesaid layer is formed.
10. The anti-glare layer forming method, described in 9. above, wherein after forming a microscopically roughened structure on a transparent substrate employing ink droplets of a relatively large diameter, a further microscopically roughened structure is formed employing ink droplets of a smaller diameter than that of the aforesaid ink droplets.
11. The anti-glare layer forming method, described in any one of 1.-10. above, wherein the aforesaid ink droplets comprise minute particles of a smaller diameter than that of the aforesaid ink droplets.
12. The anti-glare layer forming method, described in any one of 1.-10. above, wherein the aforesaid ink droplets comprise minute liquid droplets of a smaller diameter than that of the aforesaid ink droplets.
13. The anti-glare layer forming method, described in 12. above, wherein the difference in the refractive index between the aforesaid minute liquid droplet and the aforesaid ink droplet medium is at least 0.01.
14. The anti-glare layer forming method, described in any one of 1.-13. above, wherein in the aforesaid ink-jet system, the ink-jet head section is vibrated to eject ink droplets.
15. The anti-glare layer forming method, described in any one of 1.-14. above, wherein while employing the aforesaid transparent substrate which comprises a transparent support having thereon at least one hard coat layer, an anti-glare layer comprising a microscopically roughened structure on the surface of the aforesaid hard coat layer is formed by ejecting onto the aforesaid hard coat layer ink droplets comprising an anti-glare property providing composition which forms the aforesaid roughened structure.
16. The anti-glare layer forming method, described in 15. above, wherein when the aforesaid hard coat layer is semi-cured, a microscopically roughened structure is formed by ejecting the aforesaid ink droplets onto the surface of the aforesaid hard coat layer.
17. The anti-glare layer forming method, described in 15. or 16. above, wherein after the surface of the aforesaid hard coat layer is subjected to a plasma treatment, a microscopically roughened structure is formed by ejecting the aforesaid ink droplets onto the surface of the resulting hard coat layer.
18. The anti-glare layer forming method, described in any one of 15.-17. above, wherein the aforesaid hard coat layer incorporates a plasticizer.
19. An anti-glare layer forming method wherein an anti-glare film is produced by forming an anti-glare layer on a transparent substrate, employing the anti-glare film forming method described in any one of 1.-18. above.
20. The anti-glare film production method, described in 19. above, wherein after forming an anti-glare layer on a transparent substrate, an anti-reflection layer is provided on the aforesaid anti-glare layer.
21. An anti-glare film which is produced employing the anti-glare film production method described in 19. or 20 above.

[0036]: Added
22. In the anti-glare film producing ink-jet apparatus described in 21. above, an anti-glare layer forming ink-jet apparatus which is provided with an actinic radiation exposure section or a heating section which is disposed in such a manner that actinic radiation or heat is not directly applied to an ink-jet head section.
23. A polarizing plate comprising the anti-glare film of 21 above.
24. A display device comprising the polarizing plate of 23 above.

From the viewpoint of the foregoing, the inventors of the present invention conducted diligent investigations. As a result, it was discovered that by ejecting onto a transparent substrate ink droplets incorporating an anti-glare property providing composition forming a microscopically roughened structure employing an ink-jet system, an anti-glare layer of a microscopically roughened structure was formed on the surface of the aforesaid substrate, whereby an anti-glare layer was realized which resulted in anti-glare effects and exhibited excellent sharpness as well as excellent visibility. The present invention was thus achieved.

Specifically, it is preferable that center line mean roughness (Ra) is controlled to be in the range of 0.05-5.0, and the number of peaks having a height (a) of 0.5-10 μm is controlled to be in the range of 1-50 per 100 μm², while the aforesaid height (a) is determined employing the bottom of the valley as a standard. Further, by employing actinic radiation curing resins or heat curing resins as an anti-glare property providing composition, it has become possible to realize an extremely microscopically roughened structure specified as above. Still further, it was discovered that the targeted effects of the present invention were exhibited to a greater degree by the following means. A roughened structure of different refractive indexes is formed employing at least two types of ink droplets of different compositions; at least two types of ink droplets of different diameter are employed; after forming a microscopically roughened structure on a transparent substrate employing ink droplets of a relatively large diameter, a further microscopically roughened structure is formed employing ink droplets of a smaller diameter than that of the aforesaid ink droplets; or ink droplets are subjected to incorporation of minute particles or minute liquid droplets of a smaller diameter than that of the aforesaid ink droplets.

The anti-glare film of the present invention comprises a transparent substrate having thereon the anti-glare layer specified as above, and the aforesaid anti-glare layer may be provided directly on the aforesaid transparent substrate. However, it is more preferable that the aforesaid anti-glare layer is provided on the transparent substrate having at one or more hard coat layers. In such a case, during formation of the roughened structure of the anti-glare layer, the hard coat layer may not yet be cured. However, it is preferable that when the hard coat layer is semi-cured (semi-hardened), the anti-glare layer is provided. Further, it is more preferable that after the surface of the hard coat layer is subjected to a plasma treatment, the anti-glare layer is provided or the hard coat layer incorporates plasticizer. By achieving such a structure, it is possible to enhance adhesion between the hard coat layer and the anti-glare layer.

Further, in the anti-glare film of the present invention, it is preferable that after providing the hard coat layer and the anti-glare layer onto the transparent substrate, an reflection minimizing layer is further provided on the surface thereof. By achieving such a structure, it is possible to realize preferred anti-glare effects and reflection minimizing effects utilizing an extremely microscopically roughened structure. As a result, it became possible to realize an anti-glare film exhibiting excellent visibility.

DESCRIPTION OF THE PREFERRED EMBODIMENTS

Figure 1:
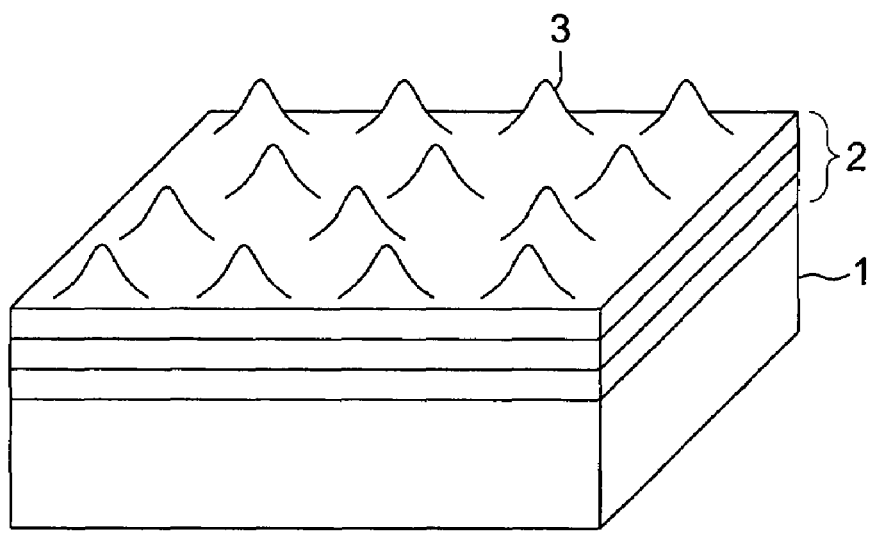
FIGS. 1(a) and 1(b) are each a schematic view showing one example in which an anti-glare layer comprised of a roughened structure is provided on a transparent substrate, employing an ink-jet system.
Figure 1:
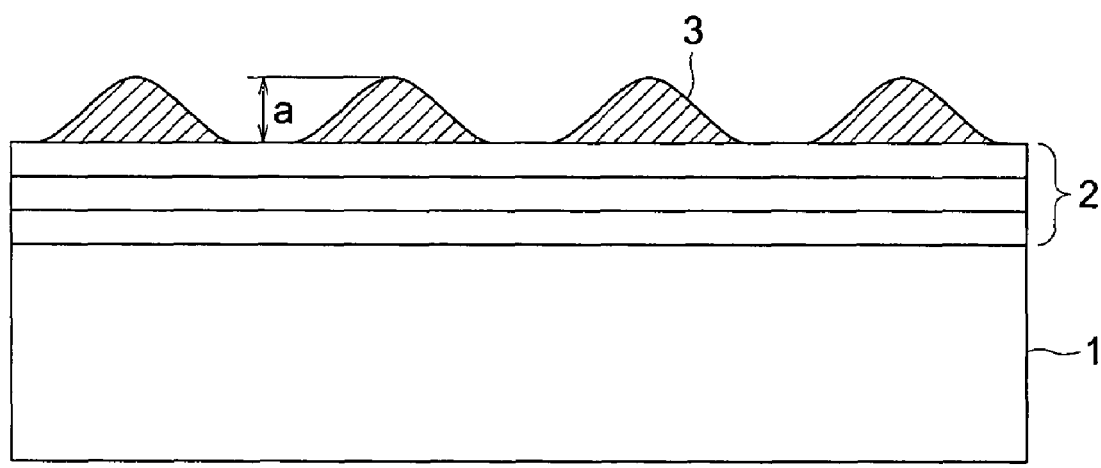

The present invention will now be detailed.

The present invention is characterized in that ink droplets comprising an anti-glare property providing component which forms a microscopically roughened structure are ejected onto a transparent substrate employing an ink-jet system to form an anti-glare layer comprising a microscopically roughened structure on the surface of the aforesaid substrate.

One of the shapes of the microscopically roughened structure according to the present invention refers to the uneven shape in which central line mean roughness Ra specified in JIS B 0601 is 0.05-5 μm. The more preferred uneven shape is of Ra of 0.07-1 μm, and the most preferred one is of Ra of 0.1-0.5 μm.

Central line mean roughness Ra specified in the present invention is defined by JIS Surface Roughness JIS B 0601 and refers to the value obtained by the formula below which is expressed employing in micrometers (μm).

$$Ra = \frac{1}{L}\int_0^L |f(x)|dx$$

The measurement method of central line mean roughness (Ra) is as follows. Samples to be measured are rehumidified at an ambience of 25° C. and 65 percent relative humidity for 24 hours under the condition in that the aforesaid samples do not overlap. Subsequently, it is possible to determine Ra at the same ambience as above. The condition in which the samples do not overlap is achieved employing any one of the methods such as one in which a sample is wound in such a state that the edge portion of the sample is raised, a paper sheet is interposed between samples and is then overlapped, or a frame is prepared employing thick paper and the four corners are secured. Listed as usable measurement apparatuses may be, for example, RSTPLUS non-contact three dimensional minute surface shape measurement system, manufactured by WYKO Co.

Further, another preferred shape of the microscopically roughened structure according to the present invention is that the number of peaks having height (a) of 0.5-10.0 μm is 1-50 per 100 μm$^2$ while the aforesaid height (a) is determined employing the bottom of the valley as a standard.

FIGS. 1(a) and 1(b) are each a schematic view showing one example in which an anti-glare layer comprising a roughened structure is provided on a transparent substrate employing an ink-jet system.

FIG. 1(a) is a perspective view of an anti-glare layer comprising a roughened structure, while FIG. 1(b) is a sectional view.

FIG. 1(b) shows one example of the anti-glare layer comprised of an roughened structure, which is prepared by liquid droplet 3 employing an ink-jet system after providing hard coat layer 2 comprising of one layer or a plurality of layers on transparent substrate 1. Height (a) specified in the present invention while employing the bottom of the concave as a standard is defined as the height (in μm) to the tip of the peaks of the roughened structure from the base of the surface of the hard coat layer.

It is possible to determine the microscopically roughness of the surface of the anti-glare layer, employing a commercially available needle sensing type surface roughness measuring apparatus, or an optical interference type surface roughness measuring apparatus. For example, roughness in the range of approximately 4,000 μm$^2$ (55 μm×75 μm) is two-dimensionally determined employing an optical interference type surface roughness measuring apparatus and the measured roughness is represented from the base as a contour employing different colors.

In FIG. 1, the number of peaks of a height of 0.5-10 μm from the adjacent base was counted per 100 mm$^2$ and shown. Ten peaks in one m$^2$ of an anti-glare film were randomly selected and measured, and the resulting values were averaged.

FIG. 1(b) shows one example in which ink droplets are deposited to form cone shaped convex sections as the roughened structure constituting the anti-glare layer in the present invention. However, the present invention is not limited to the aforesaid roughened structure.

Figure 2A:
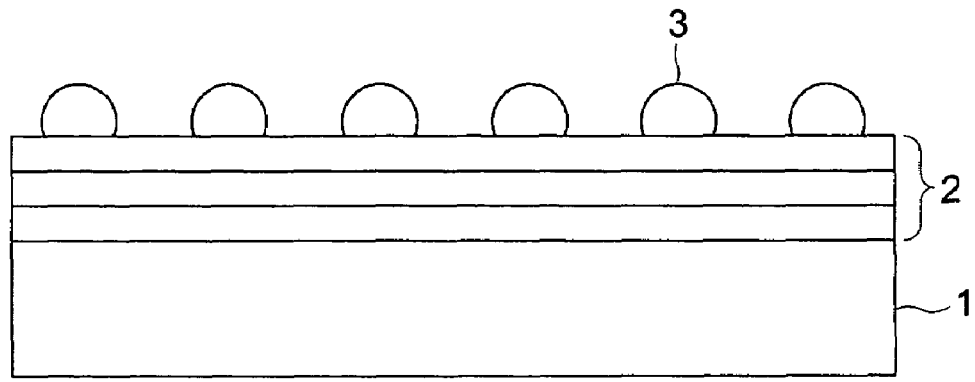
FIGS. 2(a)-2(c) are each a sectional view showing one example of another roughened structure constituting the anti-glare layer according to the present invention.
Figure 2B:
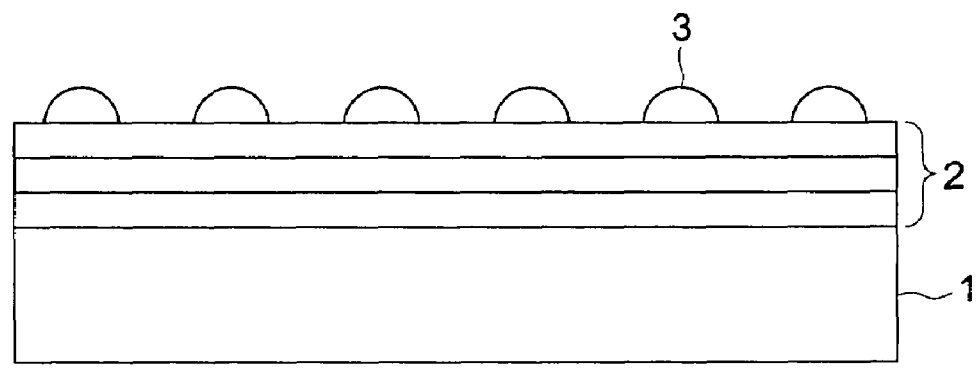
Figure 2C:
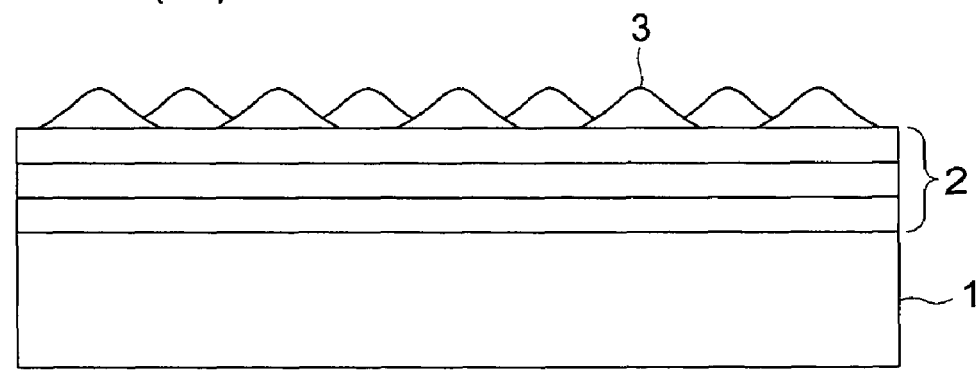

FIGS. 2(a)-2(c) are each a sectional view showing one example of another roughened structure constituting the anti-glare layer.

FIG. 2(a) is one example of the roughened structure which is formed by depositing ink droplets in the form of a sphere. It is possible to form the roughened structure with such a shape by appropriately controlling the viscosity of ejected ink droplets, as well as the contact angle between the ink droplet and the ink deposition surface. Major features of the roughened structure forming method of the present invention employing an ink-jet system are that it is possible to form the roughened structure of any desired shape, compared to conventional anti-glare layer forming methods such as a coating method.

FIG. 2(b) is a sectional view showing one example of the anti-glare layer comprising a roughened structure of a semi-circular shape.

As the aforesaid roughened structure, FIG. 2(a) shows one example in which ink droplets are deposited to leave intervals between them. However, as shown in FIG. 2(c), ink droplets may be deposited so that the deposition surface is completely covered with peaks without intervals.

The structure of the anti-glare film of the present invention is not particularly limited as long as an anti-glare layer is formed on a transparent substrate. However, it is preferable that after providing one or more hard coat layers on a transparent substrate, the anti-glare layer comprising the roughened structure specified as above is provided employing an ink-jet system.

The ink-jet system according to the present invention will now be described.

Figure 3:
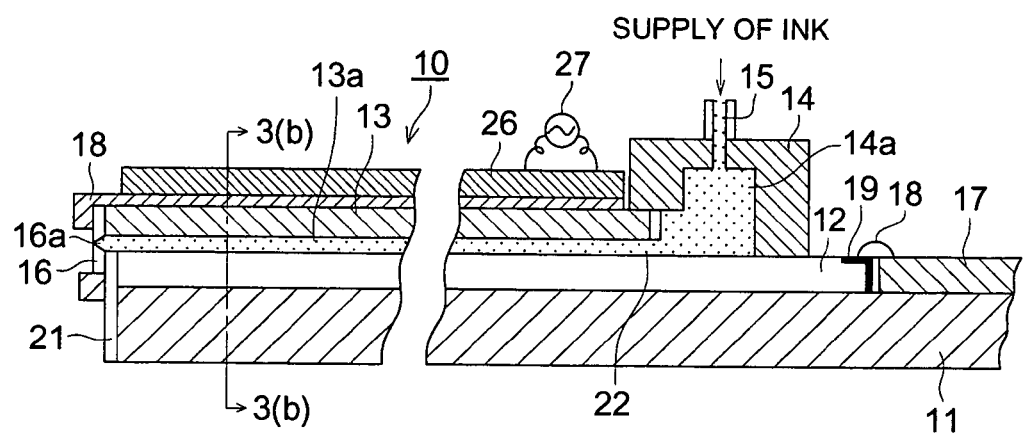
FIGS. 3(a) and 3(b) are each a sectional view showing one example of an ink-jet head usable in the ink-jet method according to the present invention.
Figure 3:
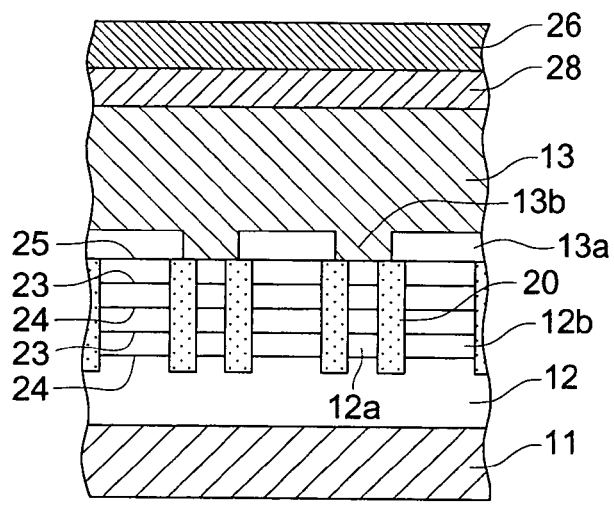

FIGS. 3(a) and 3(b) are each a sectional view showing one example of the ink-jet head usable in the ink-jet method according to the present invention.

FIG. 3(a) is a sectional view of an ink-jet head, while FIG. 3(b) is an enlarged view along line 3(b)-3(b). In FIG. 3(a), 11 is a substrate, 12 is a piezoelectric element, 13 is a flow path plate, 13a is an ink flow path, 13b is a wall section, 14 is a common liquid chamber constituting member, 14a is a common liquid chamber, 15 is an ink supply pipe, 16 is a nozzle plate, 16a is a nozzle, 17 is a drive print circuit board (PCB), 18 is a lead section, 19 is a drive electrode, 20 is a groove, 21 is a protective plate, 22 is a fluid resistance, 23 as well as 24 is an electrode, 25 is an upper partition, 26 is a heater, 27 is a heater power source, 28 is a heat transmission member, and 10 is an ink-jet head.

In integrated ink-jet head 10, laminated piezoelectric element 12 with electrodes 23 and is subjected to a machined groove in the direction of aforesaid flow path 13a, corresponding to flow path 13a. Thus aforesaid ink-jet head 10 is divided into groove 20, driving piezoelectric element 12b and non-driving piezoelectric element 12a. Fillers are sealed in groove 20. Piezoelectric element 12 which has been subjected-to a machined groove is adhered to flow path plate 13 via upper partition 25. Namely, aforesaid upper partition 25 is sustained b beyond the flow path by non-driving piezoelectric element 12a and adjacent wall section 13b. The width of driving piezoelectric element 12b is slightly narrower than that of flow path 13a. When pulsed signal voltage is applied to driving piezoelectric element which has been selected by the driving circuit on the driving printed circuit board (PCB), aforesaid driving piezoelectric element 12b varies in the thickness direction and the capacity of flow path 13a varies via upper partition 25. As a result, ink droplets are ejected from nozzle 16a of nozzle plate 16.

Heater 26 is adhered to flow path plate 13 via heat transmission member 28. Heat transmission member 28 is provided while turning around the nozzle surface. Heat transmission member 28 efficiently transmits heat from heater 26 to path plate 13 and transmits heat generated by heater 26 to the vicinity of the nozzle surface to warm air near the nozzle surface. Accordingly, materials exhibiting high heat conductivity are employed. Examples of preferred materials include metals such as aluminum, iron, nickel, copper, or stainless steel, or ceramics such as SiC, BeO, or AlN.

When the piezoelectric element is driven, the flow path is subjected to vertical displacement with respect to the longitudinal direction to result in variation of its capacity, whereby ink droplets are ejected from the nozzle. Signals are sent to the piezoelectric element so that the capacity of the flow path is continually decreased. After the direction is displaced to increase the capacity of flow path with respect to the selected flow path, pulse signals which results in displacement to decrease the capacity of the flow path are again applied, whereby ink droplets are ejected from the nozzle corresponding to the flow path.

FIGS. 4(a) and 4(b) are each a schematic view showing one example of the ink head section and the nozzle plate which can be employed in the present invention.

FIG. 4(a) is a sectional view of a head section, while FIG. 4(b) is a schematic plan view of a nozzle plate. In FIGS. 4(a) and 4(b), numeral 1 is a transparent substrate, 31 is an ink droplet, 32 is a nozzle, and 29 is an actinic radiation exposure section. Ink droplet 31 ejected from nozzle 32 is jetted toward transparent substrate 1 and deposited. Ink droplets deposited onto transparent substrate 1 are immediately exposed to actinic radiation employing actinic radiation exposure section 29 disposed upstream of the ejection and subsequently cured. Numeral 35 is a back roller which supports transparent substrate 1.

In the present invention, as shown in FIG. 4(b), it is preferable that nozzles in the ink-jet head section are arranged in a staggered array. Further, it is preferable that the aforesaid nozzles are arranged to be parallel to the conveying direction of transparent substrate 1 in the form of a multistage. Further, it is also preferable that during ink ejection, the ink-jet head section is subjected to micro-vibration so that ink droplets are randomly deposited onto the transparent substrate. By such action, it is possible to minimize the formation of interference fringes. It is possible to apply the aforesaid micro-vibration employing high frequency voltage, acoustic waves, or ultrasonic waves, even though the vibration is not particularly limited thereto.

In the present invention, preferably employed as an anti-glare layer forming method is an ink-jet system in which the anti-glare layer is formed by ejecting small ink droplets from many nozzles. Each of FIGS. 5(a)-5(c) shows one example of the ink-jet system which can preferably be employed in the present invention.

Figure 5A:
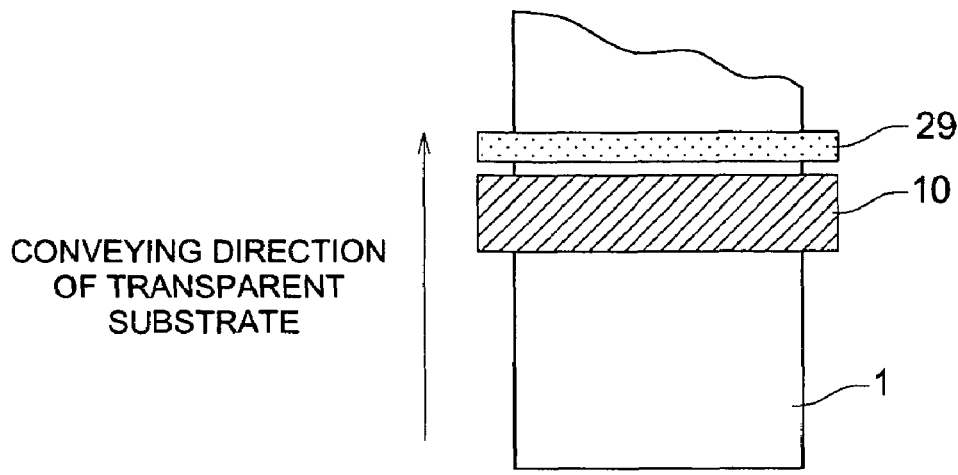
FIG. 5(a)-5(c) are each a schematic view showing one example of an ink-jet system preferably usable in the present invention.

FIG. 5(a) shows a method (a line head system) in which ink-jet head 10 is arranged in the direction across transparent substrate 1, and an anti-glare layer is formed on its surface while conveyed. FIG. 5(b) shows a method (a flat head system) in which an anti-glare layer is formed on transparent substrate 1, while ink-jet head 10 moves in the secondary scanning direction. FIG. 5(c) shows a method (a capstan system) in which an anti-glare layer is formed on the surface of transparent substrate 1, while ink-jet head 10 scans in the direction across aforesaid transparent substrate 1. It is possible to employ any of these methods, however, in the present invention, from the viewpoint of productivity, the line head system is preferred. Numeral 29 described in FIGS. 5(a)-5(c) is an actinic radiation exposure section winch is employed when the actinic radiation curing resins described below are employed to prepare ink.

Figure 5B:
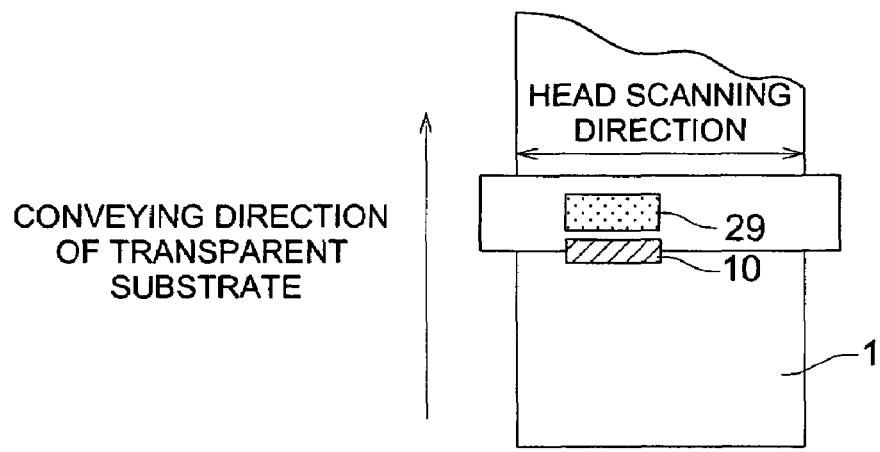
Figure 5C:
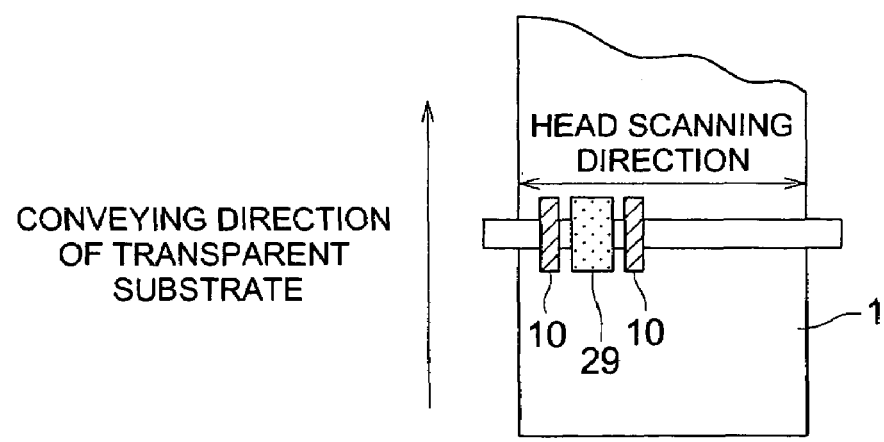

Further, in the present invention, another actinic radiation exposure section may be placed downstream of the transparent substrate of FIGS. 5(a), 5(b), and 5(c).

In the present invention, in order to form microscopically roughness, the volume of ink droplets is preferably 0.1-100 pl, is more preferably 0.1-50 pl, and is most preferably 0.1-10 pl. By ejecting ink droplets under the above conditions, it is possible to prepare an anti-glare film of excellent visibility, having microscopically roughness.

Further, the viscosity of ink droplets is preferably 0.1-100 mP·s at 25° C., and is more preferably 0.1-50 mP·s.

Transparent substrates usable in the present invention will now be described.

Listed as preferred conditions as the transparent substrates according to the present invention are: easy production, excellent adhesion to the anti-glare layer or the reflection minimizing layer, optical isotropy, and optical transparency.

Transparency, as described in the present invention, refers to visible light transmittance of at least 60 percent, preferably at least 80 percent, and most preferably at least 90 percent.

Transparent substrates are not particularly limited as long as they exhibit the aforesaid properties. Examples include cellulose ester based film, polyester based film, polycarbonate based film, polyallylate based film, polysulfone (including polyestersulfone) based film, polyester film comprised of polyethylene terephthalate or polyethylene naphthalate, polyethylene film, polypropylene film, cellophane, cellulose diacetate film, cellulose triacetate film, cellulose acetate butyrate film, polyvinylidene chloride film, polyvinyl alcohol film, ethylene vinyl alcohol film, cyndioctatic polystyrene based film, polycarbonate film, norbornane resin based film (Arton, manufactured by JSR Co.), Zeonex and Zeonare (both manufactured by Nippon Zeon Co., Ltd.), polymethylpentane film, polyether ketone film, polyether ketoneimide film, polyamide film, fluorine resin film, nylon film, polymethyl methacrylate film, acryl film, or glass plates. Of these, preferred are cellulose triacetate film, polycarbonate film, and polysulfone (including polyethersulfone) film. In the present invention, from the viewpoint of production, cost, transparency, isotropy, and adhesion property, preferably employed is cellulose ester film (e.g., Konica Tac, a trade name, KC8UX2MW, KC4UX2MW, KC5UN, KC12UR, KC8UY and KC4UY, manufactured by Konica Corp.).

With regard to optical characteristics, preferably employed transparent substrates which exhibit retardation $R_t$ in the thickness direction of 0-30 nm and retardation $R_o$ in the layer surface direction of 0-1,000 nm.

In the present invention, it is preferable to use cellulose ester film as a transparent substrate. Preferably employed as cellulose esters are cellulose acetate, cellulose acetate butyrate, and cellulose acetate propionate.

An anti-glare film is preferably employed which comprises the transparent substrate comprised of mixed fatty acid esters of cellulose which satisfy the following formulas, having thereon an anti-glare layer and an reflection minimizing layer.

$2.3 < X+Y < 3.0$ $0.1 < Y < 1.2$ wherein X represents the degree of substitution of an acetyl group, while Y represent the degree of substitution of a propionyl group or a butyryl group.

Particularly, preferred are cellulose esters which satisfy the following formulas:

$2.5 < X+Y < 2.85$ $0.3 < Y < 1.2$

When cellulose esters are employed as the transparent substrate according to the present invention, cellulose as a raw material of cellulose esters is not particularly limited, but raw materials include cotton linter, wood pulp (derived from coniferous trees or broadleaf trees), and kenaf. It is possible to use cellulose esters prepared from those raw materials while mixed in an optional ratio. When acid anhydrides (acetic anhydride, propionic anhydride, or lactic anhydride) are employed as an acylating agent, these cellulose esters are prepared by allowing cellulose raw materials to react with the acylating agent while employing organic acids, such as acetic acid, or organic solvents, such as methylene chloride, in the presence of protic catalysts such as sulfuric acid.

When the acylating agent is acid chloride (e.g., $CH_3COCl$, $C_2H_5COCl$, or $C_3H_7COCl$), reaction is conducted employing basic compounds such as amine as a catalyst. Specifically, it is possible to achieve synthesis referring to the method described in JP-A No. 10-45804. Further, cellulose esters employed in the present invention are prepared by allowing cellulose to react with the aforesaid acylating agents which are mixed so that each amount corresponds each degree of substitution. The aforesaid cellulose ester is prepared in such a manner that acylating agents react with the hydroxyl group of the cellulose. A cellulose molecule is formed by linking many glucose units and each glucose unit has three hydroxyl groups. The number of acyl groups which are introduced into three hydroxyl groups is designated as the degree of substitution (in mol percent). For example, in cellulose triacetate, all three hydroxyl groups of one glucose unit bond to an acetyl group (in practice, 2.6-3.0).

Examples of cellulose esters preferably employed in the present invention include mixed fatty acid esters of cellulose such as cellulose acetate propionate, cellulose acetate butyrate, or cellulose acetate propionate butyrate in which other than the acetyl group, the propionate group or the butyrate group is bonded. Incidentally, the butyryl group forming butyrate may be in the form of a straight chain or branched chain.

Cellulose acetate propionate which comprises a propionate group as a substituent exhibits excellent water resistance and is usefully employed as a film for liquid crystal image display apparatuses.

It is possible to determine the degree of substitution of the acyl group in accordance with the specification of ASTM D817 96.

In order to achieve sufficient mechanical strength of molded products and desired dope viscosity, the number average molecular weight of cellulose esters is preferably 70,000-250,000, and is more preferably 80,000-150,000.

The production method of supports employing a film casting method will now be described.

Film is preferably produced employing a method commonly called a dope casting method, as described later. A cellulose ester dissolving liquid (a dope) is cast from a pressure die onto a casting support such as an endless metal belt or a rotating metal drum whereby film is prepared.

Organic solvents which are used to prepare such dopes are preferably those which are capable of dissolving cellulose esters and have a suitable boiling point. Examples include methylene chloride, methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-tetrafluoro-1-propanol, 1,3-difluoro-2-propanol, 1,1,1,3,3,3-hexafluoro-2-methylpropanol, 1,1,1,3,3,3-hexafluoro2-2propanol, 2,2,3,3,3-pentafluoro-1-propnaol, nitroethane, and 1,3-dimethyl-2-imidazolidinone. Of these, listed as preferable organic solvents (namely, good solvents)

are organic halogen compounds such as methylene chloride, dioxolane derivatives, methyl acetate, ethyl acetate, and acetone.

Further, as shown in the casting process described below, in a solvent evaporation process, solvents are vaporized from a web (being a dope layer) formed on the casting support. During such a process, in order to minimize bubble formation in the web, the boiling point of used organic solvents is preferably 30-80° C. The boiling point of the aforesaid good solvents follows; methylene chloride (boiling point 40.4° C.), methyl acetate (boiling point 56.32° C.), acetone (boiling point 56.3° C.), and ethyl acetate (boiling point 76.82° C.).

Of the aforesaid good solvents, methylene chloride and methyl acetate, which exhibit excellent solubility are preferably employed. It is particularly preferable that the content of methylene chloride is at least 50 percent by weight with respect to the total organic solvents.

Other than the aforesaid organic solvents, it is preferable that alcohols having 1-4 carbon atoms are incorporated in an amount of 0.1-40 percent by weight. It is particularly preferable that the aforesaid alcohols are incorporated in an amount of 5-30 percent by weight. As described above, evaporation of solvents starts after the aforesaid dope is cast onto the dope casting support. When the ratio of alcohol increases, the resulting web (being the dope layer) is gelled. Therefore, alcohols are employed as a gelling agent which enhances the strength of the web to be easily separated from the casting support. On the other hand, when the ratio of alcohols decreases, dissolution of cellulose esters to non-chlorine based organic solvents is enhanced.

Listed as alcohols having 1-4 carbon atoms may be methanol, ethanol, n-propanol, iso-propanol, n-butanol, sec-butanol, and tert-butanol.

Of these solvents, ethanol is preferred since the resulting dope exhibits desired stability, the boiling point is relatively low, the resulting drying properties are acceptable, and minimal toxicity is exhibited. It is preferable to use solvents comprised of ethanol in an amount of 5-30 percent by weight along with methylene chloride in an amount of 70-95 percent by weight so that the total amount reaches 100 percent by weight. It is also acceptable to use methyl acetate instead of methylene chloride. In such a case, a dope may be prepared employing a cooling dissolution method.

It is preferable that the cellulose ester film employed in the present invention is oriented at least in the lateral direction. It is particularly preferable that in the solution casting process the aforesaid film is oriented at a factor of 1.01-1.5 in the lateral direction when the residual solvent ratio at peeling is 3-40 percent by weight. It is more preferable that the aforesaid film is biaxially oriented in the lateral direction as well as in the longitudinal direction of the film. In such a case, it is preferable that when the residual solvent ratio at peeling is 3-40 percent by weight, the aforesaid film is oriented in the lateral direction as well as in the longitudinal direction of the film at a factor of 1.01-1.5, respectively. By so doing, it is possible to prepare an anti-glare low reflection film which exhibits excellent visibility. Further, by achieving the aforesaid biaxial orientation and the knurling treatment described below, it is possible to markedly minimize the degradation of the wound shape when a continuous anti-glare film is stored in the roll shape.

The orientation factor is preferably 1.01-1.5 and is more preferably 1.03-1.45.

It is more preferable that the number of projections on the reverse surface, described below, is controlled to be in the specified range. By so doing, the storage stability of the anti-glare film in rolled form is effectively enhanced.

In the present invention, it is preferable that the biaxially oriented cellulose ester film is a transparent support of a light transmittance of at least 90 percent and more preferably at least 93 percent.

The thickness of the cellulose ester film supports according to the present invention is preferably 10-100 μm, and water-vapor permeability thereof is preferably at most 200 g/m²·24 hours, is more preferably 10-180 g/m²·24 hours, and most preferably at most 160 g/m²·24 hours. It is particularly preferable that the thickness is 10-60 μm while the water-vapor permeability is in the aforesaid range.

Herein, it is possible to determine the water-vapor permeability of each of the support samples in accordance with the method described in JIS Z 0208.

In the present invention, it is possible to use continuous film of a practical length of 100-5,000 m. Customarily, film is wound in a roll for supply. Further, it is preferable that the aforesaid continuous film is subjected to a knurling treatment. Knurling height, as described herein, is defined as follows.

In the present invention, it is preferable that both edges across the width of the aforesaid continuous film is subjected to a so-called knurling treatment in which both edges result in bulkiness by providing unevenness. The knurling height, as described herein, is defined described below.

Ratio X (in percent) of the knurling height (a in μm) to the film layer thickness (d in μm) is expressed by $X=(a/d)\times 100$.

In the present invention, X is preferably in the range of 1-25 percent, is more preferably 5-20 percent, and is most preferably 10-15 percent.

Further, in the present invention, it is preferable that the aforesaid knurling treatment is provided after drying but prior to winding.

When a cellulose ester film is employed as a support of the anti-glare film of the present invention, it is preferable that plasticizers which are similar to those employed in the hard coat layer, to be described below, are incorporated.

The aforesaid plasticizers may be employed individually or in combination.

From the viewpoint of film performance and processability (or easiness to process), the used amount of these plasticizers is preferably 1-20 percent by weight with respect to the cellulose esters, and is more preferably 3-10 percent by weight.

UV absorbers employed in the supports according to the present invention will now be described. UV absorbers are preferably employed in supports for glare and reflection minimizing films.

UV absorbers which are similar to those detailed in the ink described below, are preferably employed in supports for the anti-glare film of the present invention.

From the viewpoint of high absorption of the ultraviolet radiation of a wavelength shorter than 370 nm and excellent liquid crystal display properties, UV absorbers which minimize absorption of visible light are preferably employed.

Further, in order to provide the cellulose ester films employed in the present invention, with slip property, it is possible to use minute particles similar to those described in the ink.

In order to maintain haze to a lower level, the primary average diameter of minute particles incorporated into the cellulose ester film employed in the present invention is preferably 20 nm or less, is more preferably 5-15 nm, and most preferably 5-12 nm. It is preferable that when such minute particles are employed, secondary particles of a diameter of 0.1-5 μm are formed and subsequently incorporated into the cellulose ester film. The diameter of the aforesaid secondary particles is preferably 0.1-2 μm, and is more preferably 0.2-0.6 μm. By such actions, it is possible to provide suitable slip property with the film surface due to the formation of roughness of a peak height of about 0.1-about 1.0 μm on the film surface.

The average primary particle diameter of the minute particles employed in the present invention was determined as follows. Employing a transmission type electron microscope (of a magnification factor of 500,000-2,000,000), 100 particles were observed and the resulting average was designated as the average primary particle diameter.

The apparent specific gravity of minute particles is preferably at least 70 g/liter, is more preferably 90-200 g/liter, and is most preferably 100-200 g/liter. As the apparent specific gravity increases, it is possible to prepare a dispersion of higher concentration whereby the haze is minimized and the formation of aggregate is also minimized. When a dope of a high concentration of solids, which is employed in the present invention, is prepared, such minute particles are most preferably employed.

It is possible to prepare minute silicon dioxide particles of an average primary particle diameter of 20 nm or less as well as an apparent specific gravity of at least 70 g/liter, employing a method in which, for example, a mixture consisting of vaporized silicon tetrachloride and hydrogen gas is combusted in air at 1,000-1,200° C. Alternatively, it is possible to use commercially available minute particles under the trade names such as Aerosil 200V and Aerosil R972 (both manufactured by Nippon Aerosil Co., Ltd.).

The aforesaid apparent specific gravity was determined as follows. A specified amount of minute silicon dioxide particles was placed in a measuring cylinder and the weight was determined. The apparent specific gravity was calculated based on the formula below.

Apparent specific gravity (in g/liter)=weight of silicon dioxide (in g)/volume of silicon dioxide (in liter)

Listed as methods to prepare minute particle dispersion employed in the present invention are, for example, the three types described below.

Apparent specific gravity (g/liter)=weight (g) of silicon dioxide÷volume of silicon dioxide (liter)

Listed as methods for preparing minute particle dispersion employed in the present invention are, for example, three methods described below.

<<Preparation Method A>>

While stirring, solvents and minute particles are blended and the resulting mixture is dispersed employing a homogenizer. The resulting dispersion is designated as a minute particle dispersion. The aforesaid minute particle dispersion is added to a dope while stirring.

<<Preparation Method B>>

While stirring, solvents and minute particles are blended and the resulting mixture is dispersed employing a homogenizer. The resulting dispersion is designated as a minute particle dispersion. Separately, while stirring, a small amount of cellulose triacetate is added to solvents and dissolved. Subsequently, while stirring, the aforesaid minute particle dispersion is added to the solution prepared as above. The resulting mixture is designated as a minute particle additive liquid. The aforesaid minute particle additive liquid is well mixed with the aforesaid dope, employing an in-line mixer.

<<Preparation Method C>>

While stirring, a small amount of triacetate is added to solvents and allowed to dissolve. Minute particles are added to the resulting solution and the resulting mixture is dispersed employing a homogenizer. The resulting dispersion is designated as a minute particle additive liquid. Subsequently, the aforesaid minute particle additive liquid is well mixed with the aforesaid dope employing an in-line mixer.

Preparation Method A results in excellent dispersion of silicon dioxide particles, while Preparation Method C results in an excellent property in which minute silicon dioxide particles tend not to re-aggregate. Of these, aforesaid Preparation Method B is the preferable preparation method which results in excellent quality in which minute silicon dioxide particles are desirably dispersed and minute silicon dioxide particles tend not to re-aggregate.

<<Dispersion Method>>

When minute silicon dioxide particles are mixed with solvents and dispersed, the concentration of silicon dioxide is preferably 5-30 percent by weight, is more preferably 1-25 percent by weight, and is most preferably 15-20 percent by weight. As the dispersion concentration increases, liquid turbidity with respect to the added amount tends to decrease, whereby haze as well as the formation of aggregates is optimally minimized.

Of employed solvents, preferably listed as lower alcohols are methyl alcohol, ethyl alcohol, propyl alcohol, isopropyl alcohol, and butyl alcohol, however, solvents other than lower alcohols are not particularly limited. However, it is preferable to use solvents which are employed during casting of cellulose esters.

The added amount of minute silicon dioxide particles to cellulose esters is preferably 0.01-0.3 part by weight with respect to 100 weight parts of the cellulose esters, is more preferably 0.05-0.2 part by weight, and is most preferably 0.08-0.12 part by weight. An increase in the added amount results in improvement of the dynamic friction factor, while a decrease in the added amount results in a decrease in haze as well as in the formation of aggregates.

Employed as homogenizers may be the common ones. Homogenizers are divided mainly into media homogenizers and medialess (or media-free) homogenizers. Dispersion of minute silicon dioxide particles is preferably carried out employing the medialess homogenizers to result in a resulting decrease in haze.

Listed as media homogenizers are a ball mill, a sand mill, and a Dynomill.

Medialess homogenizers include ultrasonic types, centrifugal types, and high pressure types. In the present invention, preferred are high pressure homogenizers, which are apparatuses in which by passing a mixed composition consisting of minute particles and solvents through a narrow pipe at a high rate, special conditions such as high shearing and a high pressure state are created. When dispersion is carried out employing a high pressure homogenizer, it is preferable, for example, that the maximum pressure condition in a diameter 1-2,000 μm narrow pipe is at least 9.807 Mpa in the apparatus and is more preferably at least 19.613 Mpa. Further, during the operation, it is preferable that the maximum attainable rate is at least 100 m/second, while the heat transmission rate reaches at least 420 kJ/hour.

Examples of high pressure homogenizers, as described above, include an ultra-high pressure homogenizer (under the trade name of Micrifluidizer), manufactured by Microfluidics Corp., Nanomizer, manufactured by Nanomizer Co., and in addition, Manton-Gaulin type high pressure homogenizers such as Homogenizer, manufactured by Izumi Food Machinery Co. Ltd. and UHN-01, manufactured by Sanwa Machine Co., Inc.

Further, it is preferable that a dope comprising minute particles is cast onto a casting support to achieve direct contact between them. Thus, it is possible to prepare films which exhibit improved slip properties and minimal haze.

Further, until shipping after being wound into a roll, in order to protect products from staining as well as dust adhesion due to static charge, the roll is customarily packaged. Packaging materials are not particularly limited as long as the abovementioned objectives are achieved. However, preferred are those which do not hinder volatilization of the residual solvents from the film. Specifically listed are polyethylene, polyester, polypropylene, nylon, polystyrene, paper, various types of unwoven fabrics. More preferably employed are those in which fibers are woven in a mesh cross.

The cellulose ester film according to the present invention may incorporate a multilayer structure which is formed by a co-casting method while employing a plurality of dopes.

The co-casting method, as described herein, includes any of the methods such as a successive multilayer casting method which constitutes two or three layers employing different dies, a simultaneous multilayer casting method in which flows are joined in a die having two or three slits whereby two or three layers are constituted, or a multilayer casting method in which the successive multilayer casting and simultaneous multilayer casting are combined.

One example of the preferable production apparatus employed to produce the cellulose ester film according to the present invention will now be described, referring to FIG. 6.

Figure 6:
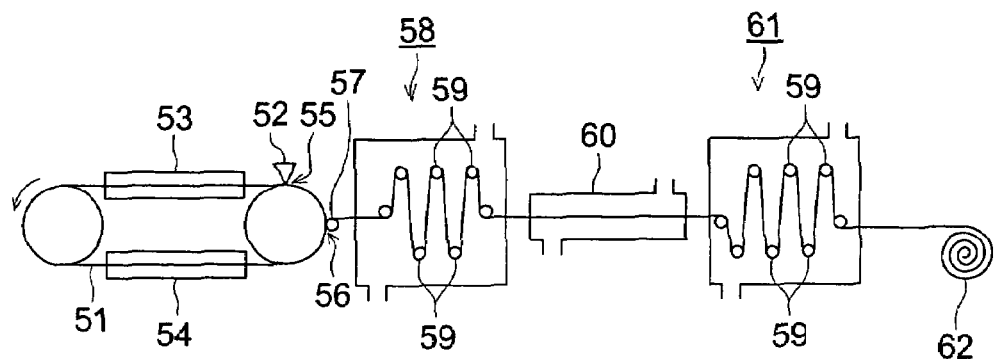
FIG. 6 is a schematic view showing one example of a preferred production apparatus which is used to produce a cellulose ester film according to the present invention.

In FIG. 6, endless stainless steel belt 51 passes through drying zones 53 and 54. In casting section 55, a dope composition is cast onto endless stainless steel belt 51 from die 52, conveyed in the arrowed direction, and dried in drying zone 53 as well as in drying zone 54, and is peeled from endless stainless steel belt 51 in peeling section 56 employing peeling roller 57. The peeled film further passes through first drying zone 58, is conveyed to second drying zone 60, then conveyed to third drying zone 61, and wound in winding section 62 as a product. Incidentally, in first drying zone 58 as well as third drying zone 61, in order to lengthen the drying path, the film is conveyed by conveying rollers 59.

In the second drying zone, by employing an orientation means such as a tenter, a film is oriented in the direction across the width or in both lateral and longitudinal directions of the film.

Further, in the present invention, cellulose esters which result in minimal bright spots due to foreign matter, when cast into film, are preferably employed to prepare supports. Bright spots due to foreign matter, as described in the present invention, refer to spots described below. A cellulose ester film is placed between two polarizing plates which are orthogonally arranged (cross Nicol). Subsequently, light from a light source is exposed onto one surface of the resulting polarizing plates and the other surface is viewed. Spots which are viewed due to leakage of light from the light source are designated as the bright spots due to foreign matter.

In such a case, it is desired that polarizing plates used for evaluation are constituted employing protective films without bright spots due to foreign matter. Further, preferably employed are polarizing plates in which glass plates are employed to protect the polarizer. It is assumed that one of the causes of bright spots due to foreign matter is the presence of non-acetylated cellulose incorporated into cellulose esters. It is possible to remove or minimize bright spots by employing cellulose esters comprising minimal amounts of non-acetylated cellulose or by filtering a dope which is prepared by dissolving cellulose esters. Further, as the thickness of the film decreases, the number of bright spots due to foreign matter also decreases. As the content of cellulose esters in the film decrease, bright spots due to foreign matter tend to also decrease.

The number of bright spots due to foreign matter of a diameter of at least 0.01 mm is preferably at most 200/cm$^2$, is more preferably at most 100/cm$^2$, 50/cm$^2$, 30/cm$^2$, or 10/cm$^2$, and is most preferably nothing at all.

Further, the number of the bright spots of a diameter of 0.005-0.01 mm is preferably at most 100/cm$^2$, is more preferably at most 50/cm$^2$, 30/cm$^2$, 30/cm$^2$, or 10/cm$^2$, and is most preferably nothing at all. The number of the bright spots of a diameter of at most 0.005 mm is preferably as little as possible.

When foreign matter resulting in bright spots is removed by filtration, it is more preferable to filter a composition which is prepared by dissolving cellulose esters together with plasticizers, than to filter a composition which is prepared by dissolving only cellulose esters, because foreign matter resulting in bright spots is efficiently removed. Preferably employed as filters are conventional ones known in the art, such as glass fibers, cellulose fibers, and filter paper. In addition, preferably employed are ceramic and metal. The absolute filtration accuracy of filters is preferably at most 50 μm, is more preferably at most 30 μm or 10 μm, and is most preferably at most 5 μm.

It is possible to suitably combine these. Either surface type filters or depth type filters may be employed. However, the depth type filters are more preferably employed due to relatively less frequency of clogging.

Ink employed in the ink-jet system according to the present invention will now be described.

The ink according to the present invention is characterized in comprising an anti-glare property providing composition which forms a microscopically roughened structure, employing an ink-jet system. It is preferable that the aforesaid anti-glare property providing composition is comprised of either actinic radiation curable resins or heat curable resins.

Initially, actinic radiation curable resins according to the present invention will be described.

Actinic radiation curable resins, as described herein, refer to resins which are cured through a crosslinking reaction when exposed to actinic radiation such as ultraviolet radiation or electron beams. Listed as representative actinic radiation curable resins are ultraviolet radiation curable resins as well as electron beam curable resins. However, are also acceptable resins which are cured by exposure to actinic radiation other than ultraviolet radiation and electron beams.

Listed as ultraviolet radiation curable resins may be, for example, ultraviolet radiation curable acrylic urethane based resins, ultraviolet radiation curable polyester acrylate based resins, ultraviolet radiation curable epoxy acrylate based resins, ultraviolet radiation curable polyol acrylate based resins, or ultraviolet radiation curable epoxy resins.

The ultraviolet radiation curable acrylic urethane based resins are easily prepared in such a manner that acrylate based monomers having a hydroxyl group such as 2-hydroxyethyl acrylate, 2-hydroxyethyl methacrylate (hereinafter, acrylate includes acrylate itself and methacrylate, and acrylate represents both), or 2-hydroxypropyl acrylate are allowed to react with the product which is commonly prepared by allowing polyester polyols to react with isocyanate monomers or prepolymers. For example, preferably employed is a mixture consisting of 100 parts of Unidick 17-806 (manufactured by Dainippon Ink and Chemicals Inc.) and one part of Coronate L (manufactured by Nippon Urethane Industry Co., Ltd.), described in JP-A No. 59-151110.

Ultraviolet radiation curable polyester acrylate based resins are easily prepared by commonly allowing a hydroxyl group and a carboxyl group at the terminal of polyesters to react with monomers such as acrylic acid (for example, JP-A No. 59-151112).

Ultraviolet radiation curable epoxy acrylate based resins are prepared by allowing a hydroxyl group at the terminal of epoxy resins to react with monomers such as acrylic acid, acrylic acid chloride, or glycidyl acrylate.

Listed as ultraviolet radiation curable polyol acrylate based resins may be ethylene glycol (meth)acrylate, polyethylene glycol di(meth)acrylate, glycerin tri(meth)acrylate, trimethylolpropane triacrylate, pentaerythritol triacrylate, pentaerythritol tetraacrylate, dipentaerythritol pentaacrylate, dipentaerythritol hexaacrylate, alkyl modified dipentaerythritol pentaacrylate.

Epoxy based actinic radiation reactive compounds are shown as the examples of ultraviolet radiation curable epoxy acrylate based resins and ultraviolet radiation curable epoxy resins.

(a) Glycidyl ethers of bisphenol A (this compound is prepared by allowing epichlorohydrin to react with bisphenol A in the form of a mixture of reaction products of different degrees of polymerization)

(b) Compounds having a glycidyl ether group at its terminal, which are prepared by allowing compounds having two phenolic OH groups such as bisphenol A to react with epichlorohydrin, ethylene oxide, and/or propylene oxide (c) Glycidyl ethers of 4,4'-methylenebisphenol (d) Epoxy compounds of phenol formaldehyde resins of novolac resins or resol resins (e) Compounds having alicyclic epoxide such as bis(3,4-epoxycyclohexylmethyl) oxalate, bis(3,4-epoxycyclohexylmethyl) adipate, bis(3,4-epoxy-6-cyclohexylmethyl) adipate, bis(3,4-epoxycyclohexylmethyl) pimelate), 3,4-epoxycyclohexylmethyl-3,4-epoxycyclohexane carboxylate, 3,4-epoxy-i-methylcyclohexylmethyl-3',4'-epoxycyclohexane carboxylate, 3,4-epoxy-1-methyl-cyclohexylmethyl-3',4'-epoxy-1'-methylcyclohexane carboxylate, 3,4-epoxy-6-methyl-cyclohexylmethyl-3',4'-epoxy-6'-methyl-1'-cyclohexane carboxylate, 2-(3,4-epoxycyclohexyl-5',5'-spiro-3",4"-epoxy)cyclohexane-metha-dioxane (f) Diglycidyl ethers of dibasic acid such as diglycidyl oxalate, diglycidyl adipate, diglycidyl tetrahydrophthalate, diglycidyl hexahydrophthalate, or diglycidyl phthalate (g) Diglycidyl ethers of glycol such as ethylene glycol diglycidyl ether, diethylene glycol diglycidyl ether, propylene glycoldiglycidyl ether, polyethylene glycol diglycidyl ether, polypropylene glycol diglycidyl ether, copoly(ethylene glycol-propylene glycol) diglycidyl ether, 1,4-butanediol glycidyl ether, or 1,6-hexanediol glycidyl ether (h) Glycidyl esters of polymer acid such as polyacrylic acid polyglycidyl ester or polyester diglycidyl ester (i) Glycidyl ethers of polyhydric alcohols such as glycerin triglycidyl ether, trimethylolpropane triglycidyl ether, pentaerythritol glycidyl ether, pentaerythritol triglycidyl ether, pentaerythritol tetraglycidyl ether, or glucose triglycidyl ether (j) Diglycidyl ethers of 2-fluoroalkyl-1,2-diol such as compounds similar to exemplified compounds listed in fluorine containing epoxy compounds of the aforesaid fluorine containing resins as a material of a low refractive index (k) Listed as diol glycidyl ethers containing fluorine at the alkane terminal may be fluorine containing epoxy compounds of fluorine containing resins of the aforesaid materials of a low refractive index.

The average molecular weight of the aforesaid epoxy compounds is customarily at most 2,000, and is preferably at most 1,000.

When the aforesaid epoxy compounds are cured employing actinic radiation, in order to further enhance the resulting hardness, it is effective to simultaneously use compounds having a multifunctional epoxy group listed in (h) or (i), while mixed.

Photopolymerization initiators or photosensitizers, which allow epoxy based actinic radiation reactive compounds to undergo cationic polymerization, are compounds capable of releasing cationic polymerization initiators while exposed to actinic radiation. Particularly preferred are a group of double salts of onium salts which release Lewis acid with a cationic polymerization initiating capability when exposed to radiation.

Actinic radiation reactive epoxy resins undergo no radical polymerization but cationic polymerization to form a crosslinking structure or a net structure. The aforesaid actinic radiation reactive resins are preferred since the reaction system is not affected by oxygen, being different from radical polymerization.

Actinic radiation reactive epoxy resins, which are useful in the present invention, undergo polymerization in the presence of photopolymerization initiators which release compounds which initiate cationic polymerization upon exposure to actinic radiation or photosensitizers. Particularly preferred as photopolymerization initiators are a group of double salt of onium salts which release Lewis acid which initiates cationic polymerization upon being exposure to radiation.

Representative compounds of the above include those represented by General Formula (a) given below.

General Formula (a)

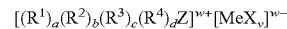

$$[(R^1)_a(R^2)_b(R^3)_c(R^4)_d Z]^{w+}[MeX_v]^{w-}$$

wherein the cation is onium; Z represents S, Se, Te, P, As, Sb, Bi, O, halogen (e.g., I, Br or Cl), or N=N (diazo); $R^1$, $R^2$, $R^3$, and $R^4$ each represents an organic group which may be the same or different; a, b, c, and d each represents an integer of 0-3; and a+b+c+d is the same as the valence of Z; Me represents a metal or a metalloid, which is the central atom in the halide complex, such as B, P, As, Sb, Fe, Sn, Bi, Al, Ca, In, Ti, Zn, Sc, V, Cr, Mn, or Co; X represents halogen; w represents the net electric charge of a halide complex ion; and v represents the number of halogen atoms in the halide complex ion.

Listed as specific examples of anion $[MeX_v]^{w-}$ of aforesaid General Formula (a) may be tetrafluoroborate ($BF_4^-$), tetrafluorophosphate ($PF_4^-$), tetrafluoroantimonate ($SbF_4^-$), tetrafluoroarsenate ($AsF_4^-$), and tetrachloroantimonate ($SbCl_4^-$).

Further listed as other anions may be perchlorate ions ($ClO_4^-$), trifluoromethylsulfite ions ($CF_3SO_3^-$), fluorosulfonate ions ($FSO_3^-$), toluenesulfonate ions, and trinitrobenzoic acid anions.

Of such onium salts, it is particularly effective to use aromatic onium salts as a cationic polymerization initiator. Further, of these, preferred are aromatic haronium salts described in JP-A Nos. 50-151996 and 50-158680, VIA group aromatic onium salts described in JP-A Nos. 50-151997, 52-30899, 59-55420, and 55-125105, oxosulfoxonium salts described in JP-A Nos. 56-8428, 56-149402, and 57-192429, aromatic diazonium salts described in Japanese Patent Publication No. 49-17040, and thiopyrilium salts described in U.S. Pat, No. 4.139,655. In addition, listed may be aluminum complexes and photodecomposing silicon compounds based polymerization initiators. It is possible to use the aforesaid cationic polymerization initiators together with photosensitizers such as benzophenone, benzoin isopropyl ether, or thioxanthone.

Further, in the case of actinic radiation reactive compounds having an epoxy acrylate group, it is possible to use photosensitizers such as n-butylamine, triethylamine, and tri-n-butylphosphine. When the aforesaid photosensitizers and photoinitiators employed in actinic radiation reactive compounds are used in an amount of 1-15 parts by weight with respect to 100 parts by weight of the ultraviolet radiation reactive compounds, such addition amount is sufficient to initiate the desired reaction. The amount is preferably 1-10 parts by weight. The aforesaid sensitizers are preferred which have maximum absorption from the near ultraviolet radiation range to the visible light range.

In actinic radiation curable resinous compositions useful in the present invention, the added amount of polymerization initiators is preferably 0.1-15 parts by weight with respect to 100 parts by weight of the actinic radiation curable epoxy resins (being prepolymers), and is more preferably in the range of 1-10 parts by weight.

Further, it is possible to use epoxy resins together with the aforesaid urethane acrylate type resins or polyether acrylate type resins. In such cases, it is preferable to use actinic radiation radical polymerization initiators together with actinic radiation cationic polymerization imitators.

Further, in the anti-glare layer according to the present invention, it is possible to use oxetane compounds. Used oxetane compounds are those having a 3-membered oxetane ring containing oxygen or sulfur. Of these, preferred are compounds having an oxetane ring containing oxygen. The oxetane ring may be substituted with a halogen atom, a haloalkyl group, an arylalkyl group, an alkoxyl group, an alkyloxy group, or an acetoxy group. Specific examples include 3,3-bis(chloromethyl)oxetane, 3,3-bis(iodomethyl)oxetane, 3,3-bis(methoxymethyl)oxetane, 3,3-bis(phenoxymethyl)oxetane, 3-methyl-3-chloromethyloxetane, 3,3-bis(acetoxymethyl)oxetane, 3,3-bis(fluoromethyl)oxetane, 3,3-bis(bromomethyl)oxetane, and 3,3-dimethyloxetane. Further, in the present invention, any of the various monomers, oligomers, and polymers are acceptable.

Specific examples of ultraviolet radiation curable resins usable in the present invention include KR-400, KR-550, KR-566, KR-567, and BY-320B of Adekaoptomer KR or BY Series (all manufactured by Asahi Denka Co., Ltd.); Koei Hard A-101-KK, A-101-WS, C-302, C-401-N, C-501, M-101, M-102, T-102, D-102, NS-101, FT-102Q8, MAG-1-P20, AG-106, and M-101-C (all manufactured by Koei Chemical Co., Ltd.); Seika Beam PHC2210 (S), PHCX-9 (K-3), PHC2213, DP-10, DP-20, DP-30, P1000, P1100, P1200, P1300, P1400, P1500, P1600, and SCR900 (all manufactured by Dainichiseika Color & Chemicals Mfg. Co., Ltd.); KRM7033, KRM7039, KRM7130, KRM7131, UVECRYL29201, and UVECRYL29202 (all manufactured by Daicel UCB Co., Ltd.); RC-5015, RC-5016, RC-5020, RC-5031, RC-5100, RC-5102, RC-5120, RC-5122, RC-5152, RC-5171, RC-5180, and RC-5181 (all manufactured by Dainippon Ink and Chemicals Inc.); Orlex No. 340 Clear (manufactured by Chugoku Marine Paints, Ltd.); Sunrad H-601, RC-750, RC-700, RC-600, RC-500, RC-611, and RC-612 (all manufactured by Sanyo Chemical Industries, Ltd.); SP-1509 and SP-1507 (both manufactured by Showa Highpolymer Co., Ltd.); RCC-15C (manufactured by Grace Japan Co., Ltd.); Aronics M-6100, M-8030, and M-8060 (all manufactured by Toagosei Co., Ltd.). Further, it is possible to suitably select and use other appropriate commercially available products.

In the ink according to the present invention, it is possible to mix prior art thermoplastic resins or binders such as gelatin or hydrophilic resins with the aforesaid actinic radiation curable resins and to employ the resulting mixture. It is preferable that these resins have a polar group in the molecule. Listed as polar groups may be —COOM, —OH, —NR$_2$, —NR$_3$X, —SO$_3$M, —OSO$_3$M, —PO$_3$M$_2$, and —OPO$_3$M, (wherein M represent a hydrogen atom, an alkaline metal, or an ammonium group, X represent an acid to form an amine salt, and R represents a hydrogen atom or an alkyl group).

The aforesaid actinic radiation reactive compounds employed in the present invention are subjected to initiation of photopolymerization, or to a photo-crosslinking reaction by themselves. However, commonly, the induction period of polymerization is long and the initiation of polymerization is delayed. As a result, it is preferable to use photosensitizes and photoinitiators, whereby it is possible to increase the rate of polymerization.

When inks according to the present invention comprise actinic radiation curable resins, it is possible to use photoreaction initiators as well as photosensitizers while exposed to actinic radiation.

Specifically listed may be acetophenone, benzophenone, hydroxybenzophenone, Michler's ketone, α-amyloxime ester, and thioxanthone and derivatives thereof. Further, when photoreactive agents are employed during synthesis of epoxy acrylate based resins, it is possible to employ sensitizers such as n-butylamine, triethylamine, or tri-n-butylphosphine. One of preferable photosensitizers is Irgacure 184(Ciba Specialty Chemicals Inc.) Further, when ultraviolet radiation curable resins are employed as an actinic radiation curable resin, UV absorbers may be incorporated into an ultraviolet radiation curable resin composition at a range in which photocuring of the aforesaid ultraviolet radiation curable resins is not hindered.

Preferably employed as UV absorbers which efficiently absorb ultraviolet radiation of wavelengths shorter than 370 nm and minimally absorb visible light of wavelengths longer than 400 nm to result in good liquid crystal display properties.

Specific examples of UV absorbers which are preferably employed in the present invention include, but are not limited to, oxybenzophenone based compounds, benzotriazole based compounds, salicylic acid ester based compounds, benzophenone based compounds, cyano acrylate based compounds, and nickel complex based compounds.

Preferably employed as benzotriazole based UV absorbers are compounds represented by General Formula (1) described below.

General Formula (1)

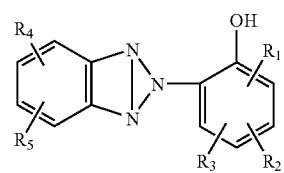

wherein $R_1$, $R_2$, $R_3$, $R_4$, and $R_5$ may be the same or different, and each represents a hydrogen atom, a halogen atom, a nitro group, a hydroxyl group, an alkyl group, an alkenyl group, an aryl group, an alkoxy group, an acyloxy group, an aryloxy group, an alkylthio group, an arylthio group, a mono- or dialkylamino group, an acylamino group, or a 5-or 6-membered heterocyclic ring group, and $R_4$ and $R_5$ may be combined with each other to from a 5-or 6-membered carbon ring.

Further, the aforesaid groups may have optional substituent (s).

Specific examples of UV absorbers according to the present invention are listed below. However, the present invention is not limited thereto.

UV-1: 2-(2'-hydroxy-5'-methylphenyl)benzotriazole
UV-2: 2-(2'-hydroxy-3',5'-di-tet-butylphenyl)benzotriazole
UV-3: 2-(2'-hydroxy-3'-tert-butyl-5'-methylphenyl)benzotriazole
UV-4: 2-(2'-hydroxy-3',5'-di-tert-butylphenyl)-5-chlorobenzotriazole
UV-5: 2-(2'-hyroxy-3'-(3",4",5",6"-tetrahydrophthalimidomethyl)-5'-methylpheny)benzotriazole
UV-6: ,2-methylenebis(4-(1,1,3,3-tetramethylbutyl)-6-(2H-benzotriazole-2-il)phenol)
UV-7: 2-(2'-hydroxy-3'-tert-butyl-5'-methylphenyl)-5-chlorobenzotriazole
UV-8: 2-(2H-benzotriazole-2-il)-6-(straight chain and side chain dodecyl)-4-methylphenol (TINUVIN 171, manufactured by Ciba-Geigy Corp.)
UV-9: a mixture (TINUVIN 109, manufactured by Ciba-Geigy Corp.) of octyl-3[3-tert-butyl-4-hydroxy-5-(chloro-2H-benzotriazole-2-il)phenyl]propionate and 2-ethylhexyl-3-[3-tert-butyl-4-hydroxy-5-(5-chloro-2H-benzotriazole-2-il)phenyl]propionate Further, preferably employed as benzophenone based UV absorbers are compounds represented by General Formula (2) described below.

General Formula (2)

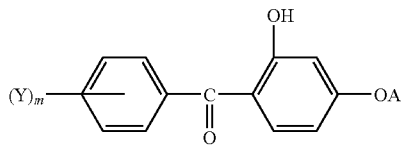

wherein Y presents a hydrogen atom, an alkyl group, an alkenyl group, an alkoxyl group, and a phenyl group and the alkyl group, alkenyl group and phenyl group may have substituent(s); A represents a hydrogen atom, an alkyl group, an alkenyl group, a phenyl group, a cycloalkyl group, an alkylcarbonyl group, an alkylsulfonyl group, or-CO(NH)n-1; D represents an alkyl group, an alkenyl group, or a phenyl group which may have a substituent; m and n each represents 1 or 2.

In the foregoing, the alkyl group represents, for example, a straight chain or a branched aliphatic group having at most 24 carbon atoms; the alkoxyl group represents, for example, an alkoxyl group having at most 18 carbon atoms; the alkenyl group represents, for example, an alkenyl group having at most 16 carbon atoms such as an aryl group or a 2-butenyl group. Further, listed as substituent to the alkyl group, the alkenyl group, and the phenyl group are, for example, a halogen atom such as a chlorine atom, a bromine atom, or a fluorine atom, a hydroxyl group, and a phenyl group (this phenyl group may be substituted with an alkyl group or a halogen atom).

Specific examples of benzophenone based compounds represented by General Formula (2) are shown blow. However, the present invention is not limited thereto.
UV-10: 2,4-dihydroxybenzophenone
UV-11: 2,2'-dihydroxy-4-methoxybenzophenone
UV-12: 2-hydroxy-4-methoxy-5-sulfobenzophenone
UV-13: bis(2-methoxy-4-hydroxy-5-benzoylphenylmethane)

UV absorbers which are preferably employed in the present invention include benzotriazole based UV absorbers and benzophenone based UV absorbers which exhibit high transparency and excellent effects to minimize degradation of polarizing plates as well as liquid crystals. Of these, more preferably employed are benzotriazole based UV absorbers which exhibit less undesired coloration.

Further, UV absorbers at a distribution coefficient of at least 9.2, described in JP-A No. 2001-187835, enhance the surface quality of supports and exhibit excellent coating properties. It is particularly preferable to use UV absorbers of a distribution coefficient of at least 10.1.

Further, preferably employed are macromolecular UV absorbers (or ultraviolet radiation absorptive polymers) represented by General Formula (2) described in JP-A No. 6-148430 and represented by General Formulas (3), (6), and (7) described in JP-A No. 2000-156039. As a macromolecular UV absorber, PUVA-30M (manufactured by Otsuka Chemical Co., Ltd.) is commercially available.

Still further, in order to enhance heat resistance of the anti-glare layer formed by an ink-jet system, selected and employed may be antioxidants which do not retard a photocuring reaction. Examples include hindered phenol derivatives, thiopropionic acid derivatives, and phosphite derivatives. Specifically listed are, for example, 4,4'-thiobis(6-tert-3-methylphenol), 4,4'-butylidenebis(6-tert-butyl-3-methylphenol), 1,3,5-tris(3,5-di-tert-butyl-4-hydroxybenzyl)isocyanurate, 2,4,6-tris(3,5-di-tert-butyl-4-hydroxybenzyl)mesitylene, and di-octadecyl-4-hydroxy-3,5-di-tert-butylbenzyl phosphate.

It is preferable that antistatic agents such as minute electrically conductive particles comprised of $SnO_2$, ITO, or ZnO as well as crosslinking cationic polymer particles are incorporated into inks according to the present invention. Further, these compounds may be incorporated into the hard coat layer described below, which is provided on a transparent substrate.

In the present invention, when an anti-glare layer, formed by the ink-jet system, comprises actinic radiation curable resins, a preferred actinic radiation exposure method is that actinic radiation is exposed immediately after deposition of ink droplets onto the transparent substrate.

Immediately after deposition of ink droplets onto the transparent substrate, as described in the present invention, refers to the time after deposition of ink droplets which is preferably 0.001-2.0 seconds, and is more preferably 0.001-1.0 second. The exposure interval of an exposure light source of 0.001 second or less is not preferred due to the following reasons. The nozzle section excessively approaches the exposure light source. As a result, the head is stained with sublimed materials formed by the curing reaction, and nozzles tend to suffer from clogging due to stray exposure light onto the ink ejection section. Further, when the exposure interval of the exposure light source exceeds 2.0 seconds, it becomes difficult to form the desired roughened structure specified by the present invention due to the flow and shape variation of deposited ink droplets.

In order to minimize the aforesaid stray light reaching the nozzle section, in the ink-jet system of the present invention, it is preferable that the actinic radiation exposure section is arranged in a position so that actinic radiation does not directly act on the nozzle section of the ink-jet head. Further, it is preferable that a light shielding plate is provided so that the exposed actinic radiation does not act on the nozzle section of the ink-jet head.

Further, actinic radiation exposure immediately after deposition of ink droplets may be carried out in such a level that fluidity of deposited ink droplets decreases to form a desired roughened structure. In other words, the ink droplets may be in a semi-cured state. In such cases, it is possible to completely cure the ink droplets by exposure to actinic radiation employing an actinic radiation source which is separately arranged downstream. In such a manner, it is possible to minimize clogging which is caused by the action of actinic radiation on the nozzle section of the ink-jet head.

Actinic radiation usable in the present invention includes ultraviolet radiation, electron beams, and γ rays. It is possible to use radiation without any limitations as long as it activates the actinic radiation curable resins which are anti-glare property providing compositions. Of radiation, ultraviolet radiation and electron beams are preferred and of these, the ultraviolet radiation is more preferred, since it is easily handled and high energy is also easily obtained. Employed as ultraviolet radiation sources, which photopolymerize ultraviolet radiation reactive compounds, may be any sources as long as ultraviolet radiation is generated. For example, it is possible to use low pressure mercury lamps, medium pressure mercury lamps, high pressure mercury lamps, ultra-high pressure mercury lamps, carbon arc lamps, metal halide lamps, or xenon lamps. In addition, it is also possible to use ArF excimer lasers, KrF excimer lasers, excimer lamps, or synchrotron radiation. Exposure conditions vary depending on each lamp, but an exposure amount is preferably at least 1 mJ/cm$^2$, is more preferably 20-10,000 mJ/cm$^2$, and is most preferably 50-2,000 mJ/cm$^2$.

In addition, it is possible to use electron beams in the same manner. Listed as electron beams may be those of an energy of 50-1,000 keV, and preferably 100-300 keV, which are released from various electron beam accelerators such a type of Cockroft-Walton type, a Van de Graff type, a resonance transform type, an insulation core transformer type, a linear type, a dynamitron type, and a high frequency type.

In the present invention, it is more preferable that the ambient concentration of oxygen during actinic radiation exposure is at most one percent.

Further, in order to efficiently proceed with a curing reaction by actinic radiation, it is possible to heat transparent substrates. Heating methods are not practically limited, but it is preferable to use heating plates, heating rollers, thermal heads, or methods in which hot air is blown onto the surface of deposited ink droplets. Further, continuous heating may be performed in such a manner that a back roller employed on the opposite side across the transparent support in the ink-jet ejection section is employed as a heating roller.

Heating temperature is not generally specified because it varies depending on the types of the used actinic radiation curable resins, however the temperature is preferably in a range which does not result in deformation of transparent substrates, and is preferably 30-200° C., is more preferably 50-120° C., and is most preferably 70-100° C.

Heat curable resins according to the present invention will now be described.

Listed as heat curable resins usable in the present invention may be unsaturated polyester resins, epoxy resins, vinyl ester resins, phenol resins, heat curable polyimide resins, and heat curable polyamidoimides.

Examples of unsaturated polyester resins include orthophthalic acid based resins, isophthalic acid based resins, terephthalic acid based resins, bisphenol based resins, propylene glycol-maleic acid based resins, low styrene volatile resins which have been subjected to a decrease of molecular weight by introducing dicyclopentadiene or derivatives thereof to an unsaturated polyester composition or to which film forming wax compounds are added, low contraction resins to which thermoplastic resins (e.g., polyvinyl acetate resins, styrene-butadiene copolymers, polystyrene, and saturated polyesters) are added, reactive resins which have been prepared by directly brominating unsaturated polyester employing Br$_2$ or by copolymerizing HET acid and dibromoneopentyl glycol, combinations of halides such as paraffin chloride or tetrabromobisphenol, antimony trioxide, and phosphor compounds, addition type fire retardant resins which employ aluminum oxide as an additive, tough resins (having high strength, high elastic modulus, and a high degree of elongation) which are prepared through a hybrid reaction with polyurethane and silicone or through a VPN reaction.

Examples of epoxy resins include bisphenol A type resins, novolac phenol type resins, bisphenol F type resins, glycidyl ether based epoxy resins comprising brominated bisphenol A, glycidylamine based resins, glycidyl ester based resins, alicyclic resins, and special epoxy resins comprising heterocyclic epoxy based compounds.

Listed as vinyl ester resins are, for example, products prepared by dissolving in monomers, such as styrene oligomers which are prepared in such a manner that generally, epoxy resins and unsaturated monobasic acid undergo ring-opening addition reaction. Further, listed are special types which have a vinyl group at the molecular terminal or the side chain and comprise vinyl monomers. Examples of such resins include bisphenol based resins, novolac based resins, and brominated bisphenol based resins. Examples of special vinyl ester resins include vinyl urethane based resins, isocyanuric acid vinyl based resins and side chain vinyl ester based resins.

Phenol resins are prepared through polycondensation, using phenols and aldehydes as raw materials, and are divided into a resol type and a novolac type.

Examples of heat curable resins include maleic acid based polyimides such as polymaleimidoamine, polyaminobismaleimide, bismaleimido.O,O'-diallylbisphenol A resins, or bis-maleimido.triazine resins, nadic acid modified polyimide, and acetylene terminal polyimide.

Further, some of the aforesaid actinic radiation curable resins are employed as a heat curable resin.

Antioxidants and UV absorbers, which are described in the ink comprised of actinic radiation curable resins, may be appropriately employed in the ink comprised of heat curable resins according to the present invention.

In the present invention, when the anti-glare layer formed by an ink-jet system comprises heat curable resins, it is preferable that as a heating method, a heating process is carried out immediately after deposition of ink droplets onto the transparent substrate.

Immediately after deposition of ink droplets onto the transparent substrate, as described in the present invention, refers to the time after deposition of ink droplets. Specifically, it is preferable that heating is initiated at the time of deposition of ink droplets or within 5 seconds after deposition of ink droplets. It is more preferable that heating is initiated 0.001-2.0 seconds after deposition of ink droplets. When the heating interval is 0.001 second or less, the nozzle section is excessively close to the heating section. As a result, when heat is transmitted to the head section, curing occurs in the nozzle section, resulting in nozzle clogging. Therefore caution is required. Further, when the heating interval exceeds 5.0 seconds, it becomes difficult to form the desired roughened structure specified by the present invention due to the flow and shape variation of deposited ink droplets.

In order to minimize transmission of heat to the nozzle section during the aforesaid heating, in the ink-jet system of the present invention, it is preferable that the heating section is arranged in such a position that the aforesaid heating section does not directly affect the nozzle section of the ink-jet head.

Heating methods are not particularly limited. However, it is preferable to use heating plates, heating rollers, thermal heads, or a method in which hot air is blown onto the surface of deposited ink droplets. Further, heating may be continuously carried out by employing, as a heating roller, a back roller arranged on the opposite side across the transparent support of the ink ejection section. Heating temperature is not specifically specified since it varies depending on the types of used heat curable resins. However, the temperature is preferably in a range which does not result in thermal deformation of transparent substrates, and is preferably 30-200° C., is more preferably 50-120° C., and is most preferably 70-100° C.

In the ink according to the present invention, employed as an anti-glare property providing composition may be both aforesaid actinic radiation curable resins and heat curable resins. However, preferably employed are the actinic radiation curable resins.

If desired, solvents may be incorporated into the aforesaid ink according to the present invention. For example, the aforesaid actinic radiation curable resin monomer component or heat curable resin monomer component may be dissolved in or dispersed into water based solvents. Alternatively, organic solvents may be employed. Selected and employed as organic solvents are those of a low boiling point or a high boiling point. In order to control the viscosity of the ink, it is preferable that the added amount, types, and composition of the ink are appropriately determined.

Examples of solvents usable in the ink according to the present invention include alcohols such as methanol, ethanol, 1-propanol, 2-propanol or butanol; ketones such as acetone, methyl ethyl ketone, or cyclohexanone; aromatic hydrocarbons such as benzene, toluene, or xylene; glycols such as ethylene glycol, propylene glycol, or hexylene glycol; glycol ethers such as ethyl cellosolve, butyl cellosolve, ethyl carbitol, butyl carbitol, diethyl cellosolve, diethyl carbitol, or propylene glycol monomethyl ether; esters such as N-methylpyrrolidone, dimethylformamide, methyl lactate, ethyl lactate, methyl acetate, ethyl acetate, or amyl acetate; ethers such as diethyl ether; and water. These may be employed individually or in combinations of at least two types. Further, particularly preferred are those having an ether bond in the molecule, while glycol ethers are also preferably employed.

Specifically listed as glycol ethers are the solvents described below. However, the present invention is not limited thereto. Listed may be propylene glycol monomethyl ether, propylene glycol monomethyl ether, propylene glycol monobutyl ether, diethylene glycol dimethyl ether, ethylene glycol monomethyl ether, ethylene glycol monomethyl ether Ac, ethylene glycol monobutyl ether, ethylene glycol monomethyl ether, ethylene glycol monomethyl ether Ac, and ethylene glycol diethyl ether. Incidentally, Ac represents acetate. In the ink according to the present invention, of these solvents, preferred are solvents of a boiling point of no more than 100° C.

Now described will be preferable embodiments to form a roughened structure employing the ink-jet system of the present invention.

One of the preferred forming methods of the anti-glare layer having a roughened structure of the present invention is a method in which the aforesaid layer is formed by ejecting at least two types of ink droplets of a different refractive index. In more detail, by employing at least two types of ink droplets which result in a difference in refractive index of at least 0.01 at 550 nm after curing, it is possible to form an anti-glare layer exhibiting excellent visibility. It is preferable to combine inks which result in a difference of refractive index of 0.03-1.0. In the inks according to the present invention, methods to satisfy the aforesaid conditions are not particularly limited. It is possible to achieve the desired difference in refractive index by selecting or controlling, for example, the type and added amount of actinic radiation curable resins and heat curable resins, the type and added amount of non-volatile organic solvents, and the type and added amount of other additives.

Other preferable forming methods of the anti-glare layer having a roughened structure in the present invention are as follows. It is preferable that the aforesaid layer is formed by ejecting at least two types of ink droplets of different particle diameters. Further, it is more preferable that after forming a microscopically roughened structure on the transparent substrata employing large diameter droplets, a more microscopically roughened structure is formed employing ink droplets of a smaller diameter than that of the aforesaid ink droplets.

Another preferable forming methods of the anti-glare layer having a roughened structure in the present invention are as follows. It is preferable that the aforesaid layer is formed by ejecting at least two types of ink droplets each having different density of solid portion therein. The different density of solid portion makes it possible to change the height or the diameter of the formed microscopically roughened structure on the transparent substrate. By making use of this property, a smaller convex structure can be formed on a larger convex structure. These structure can be preferably used to form an anti-glare layer which is capable of displaying a detailed image.

The combination of changing a particle diameter and changing a density of solid portion of the ink droplet is effectively used for the present invention.

Figure 7:
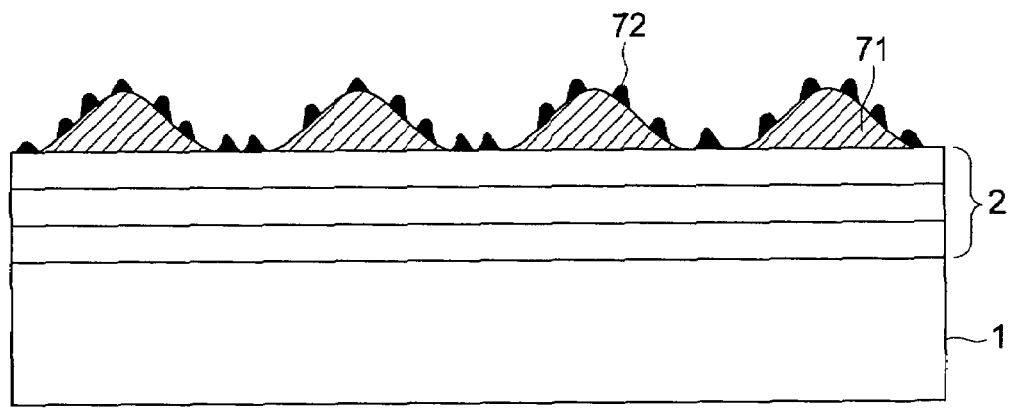
FIGS. 7(a) and 7(b) are each a schematic view showing one example in which after forming a microscopically structure employing ink droplets of a relatively large diameter according to an ink-jet system, a further microscopically structure is formed employing ink droplets of a smaller diameter.
Figure 7:
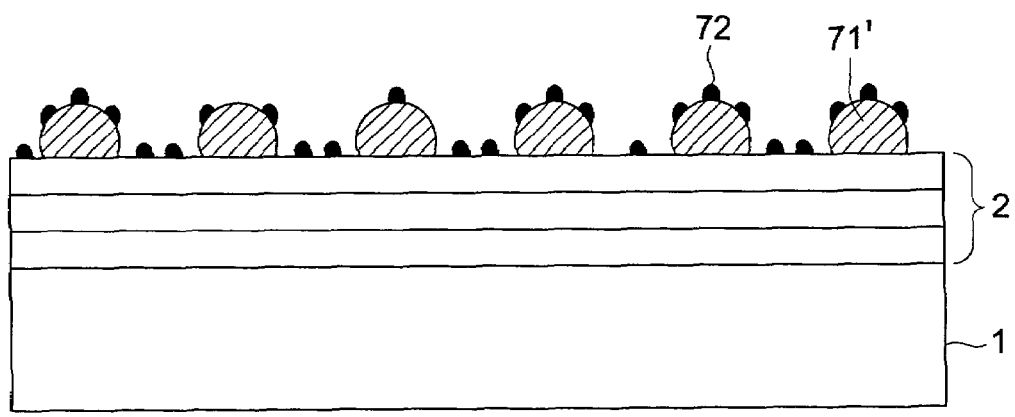

FIGS. 7(a) and (b) are schematic views showing one example in which after forming microscopically roughened structure 71 employing ink droplets of a relatively large diameter, more microscopically roughened structure 72 is formed employing ink droplets of a smaller diameter than that of the aforesaid ink droplets.

FIG. 7(a) shows one example in which after forming composite volcano-shaped convex section 71 employing a relatively low viscosity ink, microscopically convex sections 72 are formed employing the surface and non-ink droplet deposition sections, while FIG. 7(b) shows one example in which the contact angle between an ink droplet and a substrate surface is controlled and after forming convex section 71" in a spherical shape, microscopically convex sections 72 are formed on the surface and non-deposition sections.

In the present invention, by forming a microscopically roughened structure employing ink droplets of different diameters, it is possible to minimize interference fringes and to enhance the visibility of the display apparatus. The volume of each ink droplet is preferably 0.1-100 pl, is more preferably 0.1-50 pl, and is most preferably 0.1-10 p1. When at least two types of ink droplets of different sizes are employed, the volume ratio of ink droplets of the largest average diameter to ink droplets of the smallest average diameter is preferably 0.1-50 percent by volume, is more preferably 1-60 percent by volume, and is most preferably 3-50 percent by volume. A more preferable embodiment is that at least three types of ink droplets of different volumes are combined.

Further, when at least two types of ink droplets are employed, it is possible to use ink droplets of at least two different solid concentrations. For example, it is preferable that the solid concentration of smaller droplets which are mainly ejected later is less than that of larger ink droplets. By appropriately controlling the solid concentration of both types of ink droplet as above, it is possible to easily control the formation of a microscopically roughened structure as well as the shape of the droplets.

Further, in the present invention, when a roughened structure is formed by combining ink droplets of different volumes, it is preferable that after deposition of the larger ink droplets onto the transparent substrate, smaller ink droplets are then deposited thereon. After deposition of the larger ink droplets, smaller ink droplets may be deposited thereon while deposited the larger ink droplets are not yet cured. However, in the present invention, it is preferable that after deposition of the larger ink droplets, deposited ink droplets are completely cured while exposed to actinic radiation, or subjected to a heating treatment or semi-cured, and subsequently the smaller ink droplets are then deposited thereon.

In the present invention, another preferable method for forming the anti-glare layer of the roughened structure is that ink droplets comprises minute particles of a diameter which is less than that of the aforesaid ink droplets.

In the present invention, listed as minute particles which can be incorporated into ink droplets may be minute inorganic or organic particles.

Examples of preferable minute inorganic particles include compounds comprising silicon, silicon dioxide, aluminum oxide, zirconium oxide, calcium carbonate, talc, clay, calcined kaolin, calcined calcium silicate, hydrated calcium silicate, aluminum silicate, magnesium silicate, and calcium phosphate. Examples of more preferred ones include inorganic compounds comprising silicon and zirconium oxide. Of these, most preferably employed is silicon dioxide.

Employed as minute particles of silicon dioxide may be commercially available products such as Aerosil R972, R972V, R974, R812, 200, 200V, 300, R202, OX50, or TT600 (all manufactured by Nippon Aerosil Co., Ltd.).

Employed as minute particles of zirconium oxide may be commercially available products such as Aerosil R976 and R811 (both manufactured by Nippon Aerosil Co., Ltd.).

Further, listed as minute organic particles may be minute polymethacrylic acid methyl acrylate resinous particles, minute acryl styrene based resinous particles, minute polymethyl methacrylate resinous particles, minute silicon based resinous particles, minute polystyrene based resinous particles, minute polycarbonate resinous particles, minute benzoguanamine based resinous particles, minute melamine based resinous particles, minute polyolefin based resinous particles, minute polyester based resinous particles, minute polyamide based resinous particles, minute polyimide based resinous particles, or minute polyfluorinated ethylene based resinous particles.

The average diameter of minute particles employed in the present invention is preferably 0.001-10 μm, is more preferably 0.005-3 μm, and is most preferably 0.01-1 ∥m. At least two types of minute particles differing in particle diameter and refractive index may be incorporated.

Another preferred forming method of the anti-glare layer having a roughened structure in the present invention is a method in which ink droplets comprise minute liquid droplets of a diameter which is less than that of the aforesaid ink droplets.

Minute liquid droplets, as described in the present invention, are preferably present in the ink in the following manner. The aforesaid diameter liquid droplets, which is smaller than that of ink droplets, are preferably present in the ink in a phase separation state or an emulsified state. It is preferable that the aforesaid minute liquid droplets are not completely mixed with the main component of the ink. Further, after the ink is cured, difference of the resulting refractive index at 550 nm from that of the ink droplet media is preferably at least 0.01, is more preferably 0.01-2.0, is most preferably 0.03-1.0.

When the aforesaid minute particles are employed in the ink droplets, clogging of the ink-jet head may occur. However, the use of minute particles in a liquid state are most preferred due to minimal occurrence of the aforesaid clogging. Further, it is preferable that the minute liquid droplets comprise curable components and are cured after deposition. By utilizing these, it is possible to form more microscopic roughness and result in light scattering effects, whereby enhancement of visibility is achievable.

For preparing minute liquid droplets according to the present invention, it is most preferable to use metal alkoxides or hydrolyzed products or partially polymerized products thereof.

Listed as metal atoms may be Si, Ti, and Zr. Specific examples of metal alkoxides usable in the present invention include, but are not limited, to silane coupling agents such as tetramethoxysilane, tetraethoxysilane, methyltriethoxysilane, or dimethylthoxysilane, tetraisopropyltitanium, tetrabutyltitanium, tetrabutylzirconium, tetraisopropylzirconium, and tetraethoxytitanium. After deposition of ink droplets onto a transparent substrate, these metal alkoxides are cured by a curing treatment such as exposure to actinic radiation, whereby it is possible to form a roughened structure of different refractive indices depending on the types.

Other components of the anti-glare film of the present invention will now be described.

In the anti-glare film of the present invention, it is possible to from the anti-glare film directly on the transparent substrate employing an ink-jet system. However, it is more preferable that after forming at least one hard coat layer, the anti-glare layer of a roughened structure is formed on the surface of the resulting hard coat layer(s).

In the hard coat layer, it is possible to preferably use the same heat curable or actinic radiation curable resins as those employed in the ink. Of these, particularly preferred are ultraviolet radiation curable resins. Further, during formation of the hard coat layer, other than each of the aforesaid resins, it is possible to suitably add photoreaction initiators, photosensitizers, antioxidants, UV absorbers, antistatic agents, minute inorganic particles, and minute organic particles, which are the same as those described for the ink.

Further, in the present invention, the hard coat layer may be comprised of a plurality of layers. However, it is preferable that the uppermost layer of the hard coat layer(s) onto which ink droplets are deposited incorporates plasticizers.

Examples of plasticizers, which are preferably usable in the hard coat layer, include phosphoric acid ester based plasticizers, phthalic acid ester based plasticizers, trimellitic acid ester based plasticizers, pyromellitic acid based plasticizers, glycolate based plasticizers, citric acid ester based plasticizers, and polyester based plasticizers.

Preferably employed as phosphoric acid ester based plasticizers are, for example, triphenyl phosphate, tricresyl phosphate, cresyl diphenyl phosphate, octyl diphenyl phosphate, diphenyl biphenyl phosphate, trioctyl phosphate, and tributyl phosphate. Preferably employed as phthalic acid ester based plasticizers are diethyl phthalate, dimethoxyethyl phthalate, dimethyl phthalate, dioctyl phthalate, dibutyl phthalate, di-2-ethylhexyl phthalate, butylbenzyl phthalate, diphenyl phthalate, and dicyclohexyl phthalate. Preferably employed as trimellitic acid based plasticizers are tributyl trimellitate, triphenyl trimellitate, and trimethyl trimellitate. Preferably employed as pyromellitic acid ester based plasticizers are tetrabutyl pyromellitate, tetraphenyl pyromellitate, and tetraethyl pyromellitate. Preferably employed as glycolate based plasticizers are triacetin, tributyrin, ethylphthalylethyl glycolate, methylphthalylethyl glycolate, and butylphthalylbutyl glycolate. Preferably employed as citric acid ester based plasticizers are trimethyl citrate, tri-n-butyl citrate, acetyltriethyl citrate, acetyltri-n-butyl citrate, and acetyltri-n-(2-ethylhexyl) citrate. Examples of other carboxylic acid esters include butyl oleate, methylacetyl recinoleate, dibutyl sebacate, and various trimellitic acid esters.

Employed as polyester based plasticizers may be copolymers of dibasic acids, such as aliphatic dibasic acid, alicyclic dibasic acid, or aromatic dibasic acid with glycol. Aliphatic dibasic acids are not particularly limited. Employed may be adipic acid, sebacic acid, phthalic acid, terephthalic acid, and 1,4-cyclohexyldicarboxylic acid. Employed as glycols may be ethylene glycol, diethylene glycol, 1,3-propylene glycol, 1,2-propylene glycol, 1,4-butylene glycol, 1,3-butylene glycol, and 1,2-butylene glycol. These dibasic acids or glycols may be employed individually or in combinations of at least two types.

Preferably employed are epoxy based compounds described in Japanese Patent Application No. 2000-338883, rosin based compounds, and cellulose esters having additives such as phenol novolak type epoxy resins, cresol novolak type epoxy resins, or ketone resins.

The aforesaid compounds are commercially available from Arakawa Chemical Industries, Ltd. under the product name of KE-604 and KE-610 of an acid value of 237 and 170, respectively. In addition, available from Arakawa Chemical Industries, Ltd. are KE-100 and KE-356 of an acid value of 8 and 0, respectively, which are esters of a mixture of abietic acid, dehydroabietic acid and parastric acid. Further, the aforesaid mixture of abietic acid, dehydroabietic acid and parastric acid are available from Harima Chemicals, Inc. under the product name of G-7 and Hatol R—X at an acid value of 167 and 168, respectively.

Further, epoxy resins are commercially available from Asahi Ciba Co., Ltd. under the product name of Araldide EPN1179 and Araldide AER260.

Ketone resins are commercially available from Hitachi Chemical Co., Ltd. under the product name of Hilack 110 and Hilack 110H.

Paratoluenesulfoamide resins, known as Topler, are commercially available from Fuji Amido Chemical Co., Ltd.

It is preferable that the uppermost layer of the hard coat layer, onto which ink droplets forming the anti-glare layer are deposited, comprises plasticizers in an amount of 0.1-10 percent by weight. For example, it is preferable that the plasticizers are previously incorporated into the coating composition of the aforesaid hard coat layer. Alternatively, prior to coating of the hard coat layer, it is possible to apply or adhere the plasticizers onto the surface of the substrate. By these means, the adhesion property of ink droplets after curing is improved.

Suitably selected and employed as solvents during coating of the hard coat layer according to the present invention are, for example, hydrocarbons, alcohols, ketones, esters, and glycol ethers. Further, these solvents may be employed upon being mixed. Solvents are preferably employed which contain propylene glycol monoalkyl (having 1-4 carbon atoms) ether or propylene glycol monoalkyl (having 1-4 carbon atoms) ether ester in an amount of preferably at least 5 percent by weight and more preferably 5-80 percent by weight.

Employed as coaters for applying the hard coat layer liquid coating composition comprised of the composition described above onto a transparent substrate may be gravure coaters, spinner coaters, wire bar coaters, roll coaters, reverse coaters, extrusion coaters, and air doctor coaters, which are commonly known in the art. The coated amount customarily results in a wet layer thickness of 5-30 μm and preferably result in a wet layer thickness of 10-20 μm. The coating rate is preferably 10-60 m/minute, while the dried layer thickness is preferably 1-10 μm.

It is preferable that the hard coat layer composition which has been coated and dried is cured by exposure to actinic radiation such as ultraviolet radiation or electron beams, or subjected to a thermal treatment. The duration of exposure to the aforesaid actinic radiation is preferably 0.1-300seconds, and more preferably 0.1-10 seconds from the viewpoint of the curing efficiency of ultraviolet radiation curable resins and work efficiency.

In the present invention, in either case in which the hard coat layer which has been applied onto the transparent substrate, employing the aforesaid method, is not yet cured or is completely cured, ink droplets which form the anti-glare layer may be deposited employing an ink-jet system. However, it is preferable that a roughened structure is formed by depositing ink droplets after curing the hard coat layer. It is particularly preferable that when the hard coat layer is semi-cured, the roughened structure is formed by depositing ink droplets on the surface of the semi-cured layer. By such means, it is easy to form microscopically roughness and achieve excellent productivity. Further, it is possible to enhance the adhesion between the roughed structure section and the surface of the hard coat layer.

Further, it is preferable that prior to deposition of ink droplets, which form the anti-glare layer, the surface of the hard coat layer, which has been applied onto the transparent substrate employing the aforesaid method, is subjected to a plasma treatment which makes it possible to form a more microscopically roughened structure. It is particularly preferable that the surface is subjected to a plasma treatment under ambient atmospheric pressure. It is possible to achieve surface modification employing a reaction gas comprising rare gases, such as helium or argon, or discharge gases such as nitrogen or air, and if desired at least one of oxygen, hydrogen, nitrogen, carbon monoxide, carbon dioxide, nitrogen monoxide, nitrogen dioxide, water vapor, methane or tetrafluorinated methane. It is possible to apply the plasma treatment onto the surface of the hard coat layer with reference to the description of JP-A No. 2000-356714.

It is preferable that the anti-glare film is prepared as follows. After applying the hard coat layer onto a transparent substrate and subsequently drying it, the anti-glare layer of a roughened structure is formed employing the ink-jet system according to the present invention, and further, an anti-reflection layer or a stain minimizing layer is provided on the anti-glare layer.

It is preferable that the anti-reflection layer according to the present invention is formed by applying a plurality of refractive index varying layers onto the anti-glare layer. Further, it is preferable that a high refractive index layer and a low refractive index layer are coated in the stated order. The magnitude of the refractive index is approximately determined by the amount of metal or compounds therein. For example, Ti results in a high refractive index, while Si results in low refractive index. Compounds comprising F result in a lower refractive index. The refractive index is set employing combinations of these. It is possible to calculate the refractive index and the layer thickness based on the determination of the spectral reflection ratio.

The anti-glare film of the present invention comprises a transparent substrate (a support) having thereon an anti-glare layer. It is preferable that onto the aforesaid anti-glare layer, additional layers are applied to decrease the reflectance employing optical interference while considering the refractive index, the layer thickness, the number of layers, and the order of the layers. An anti-reflection layer is comprised by combining a layer of a refractive index higher than the support and a layer of a refractive index lower than the support. A particularly preferable anti-reflection layer is comprised of at least three layers of different refractive indices. Preferably employed are three layers of different refractive indices constituted as follows. From the support side, a layer of a medium refractive index (the refractive index of this layer is higher than the support or the anti-glare layer, and is lower than the layer of a high refractive index)/a layer of a high refractive index/layer of a low refractive index are applied in this order. Further, preferably employed is an anti-reflection layer comprised of at least four layers in which at least two layers of a high refractive index and at least two layers of a low refractive index are alternatively applied.

Further, if desired, it is preferable that a stain minimizing layer is further provided on the uppermost surface of the layer of a low refractive index so that stain and finger prints are easily wiped off. In the stain minimizing layer, preferably employed are fluorine containing organic silane compounds.

It is possible to form the anti-reflection layer according to the present invention, employing the aforesaid coating systems. Further, it is possible to form a metal oxide layer ($SiO_2$, $TiO_2$, $Ta_2O_5$, $ZrO$, $SnO_2$, and ITO), employing an atmospheric pressure plasma treatment or a dry process such as CVD.

It is preferable that the layer of a high refractive index according to the present invention comprises titanium oxides. These may be added in the form of minute particles. However, a more preferable layer of a refractive index of 1.55-2.5 is formed by coating a coating composition comprising monomers or oligomers of organic titanium compounds or hydrolyzed products thereof, and then drying the resultant coating.

Preferred examples of monomers and oligomers of organic titanium compounds employed in the present invention include dimers-decamers of $Ti(OCH_3)_4$, $Ti(OC_2H_6)_4$, $Ti(O-n-C_3H_7)_4$, $Ti(O-i-C_3H_7)_4$, $Ti(O-n-C_4H_9)$, and $Ti(O-n-C_3H_7)$, dimmers-decamers of $Ti(O-i-C_3H_7)$, and dimers-decamers of $Ti(O-n-C_4H_9)$. These may be employed individually or in combinations of at least two types. Of these, particularly preferred are dimers-decamers of $Ti(O-n-C_3H_7)$, $Ti(O-i-C_3H_7)$, $Ti(O-n-C_4H_9)$, and $Ti(O-n-C_3H_7)$, and dimers-decamers of $Ti(O-n-C_4H_9)$.

The proportion of monomers or oligomers of organic titanium compounds or hydrolyzed products thereof is preferably 10.0-98.0 percent by weight of the solids incorporated into the liquid coating composition, is more preferably 50-90 percent by weight, and is still more preferably 55-90 percent by weight. Other than these, it is also preferable to add organic titanium polymers (prepared by crosslinking organic titanium compounds which have been hydrolyzed) or minute titanium oxide particles to coating compositions.

Further, in the present invention, liquid coating compositions comprise partially or completely hydrolyzed products of the aforesaid monomers or oligomers of organic titanium compounds. Monomers or oligomers of organic titanium compounds undergo crosslinking through self-condensation to form a net linking structure. In order to enhance the aforesaid reaction, it is possible to use catalysts as well as hardening agents, which include metal chelate compounds, organic metal compounds such as organic carboxylic acid salts, organic silicon compounds having an amino group, and acid generating agents while exposed to light (photolytically acid generating agents). Of these catalysts and hardening agents, particularly preferred are aluminum chelate compounds and photolytically acid generating agents. Examples of aluminum chelate compounds include ethylacetoacetate aluminum diisopropirate, aluminum trisethylacetoacetate, alkylacetoacetate aluminum diisopropirate, aluminum monoacetylacetonatebisethylacetoacetate, and aluminum trisacetylacetonate. Listed as photolytically acid generating agents may be, for example, benzyltriphenylphosphonium-hexafluorophosphate, other phosphonium salts, and salts of triphenylphosphoniumhexafluorophosphate.

The proportion of solids in coating compositions of the anti-reflection layer is preferably 0.5-20 percent by weight.

Employed as binders may be acryl or methacryl based actinic radiation reactive compounds which are the same as those used in the ink, and comprise at least two polymerizable groups such as a vinyl group, an allyl group, an acryloyl group, a methacryloyl group, an isopropenyl group, an epoxy group, or an oxetane ring, and form a crosslinking structure or a net structure while exposed to actinic radiation, epoxy based actinic radiation reactive compounds or oxetane based actinic radiation reactive compounds. These compounds include monomers, oligomers, and polymers. From the viewpoint of polymerization rate as well as reactivity, of these active groups, preferred is an acryloyl group, a methacryloyl group, or an epoxy group. Multifunctional monomers or oligomers are more preferred. Further, preferably employed are actinic radiation curable resins employed in the aforesaid ink and hard coat layer. Still further, preferably employed are alcohol-soluble acryl resins.

Also preferably employed as binders in layers of medium-high refractive indices comprising titanium compounds are alcohol-soluble acryl resins, which make it possible to prepare a layer of a high refractive and a more uniform thickness. Specifically employed are alkyl (meth)acrylate polymers or alkyl (meth)acrylate polymers such as n-butyl acrylate, isobutyl acrylate, methyl methacrylate, ethyl methacrylate, and propyl methacrylate and copolymers. Copolymerization components are not limited thereto. Employed as commercially available products may be Dianar BR-50, BR-51, BR-52, BR-60, BR-64, BR-65, BR-70, BR-73, BR-75, BR-76, BR-77, BR-79, BR-80, BR-82, BR-83, BR-85, BR-87, BR-88, BR-89, BR-90, BR-93, BR-95, BR-96, BR-100, BR-101, BR-102 , BR-105, BR-107, BR-108, BR-112, BR-113, BR-115, BR-116, BR-117, and BR-118 (all manufactured by Mitsubishi Rayon Co., Ltd.). It is possible to add these monomer components as a binder for the layer of a medium—high refractive index. It is also possible to control the refractive index by varying the addition ratio of binders.

It is preferable to incorporate slipping agents into the layer of a low refractive index. By providing slipping property, it is possible to enhance abrasion resistance. Employed as slipping agents are silicone oils or wax compounds.

Specifically preferably employed may be higher fatty acids and derivatives thereof such as behenic acid, stearic acid amide, and pentaconic acid, and natural products such as carnauba wax, beeswax, and montan wax which comprise the above components. Further, listed may be polyorganosiloxanes disclosed in Japanese Patent Publication No. 53-292, higher fatty acid amides disclosed in U.S. Pat. No. 4,275,146, higher fatty acid esters (esters of fatty acids having 10-24 carbons with alcohols having 10-24 carbons) disclosed in Japanese Patent Publication No. 58-33541, British Patent No. 927,446, and JP-A Nos. 55-126238 and 58-90633, higher fatty acid metal salts disclosed in U.S. Pat. No. 3,933,516, polyester compounds comprised of dicarboxylic acids having at most 10 carbon atoms and aliphatic or alicyclic diols disclosed in JP-A No. 51-37217, and oligopolyesters comprised of dicarboxylic acids and diols.

The added amount of slipping agents employed in the layer of a low refractive index is preferably 0.01-10 mg/m². If desired, it is possible to add the slipping agents to layers of a medium refractive index and a higher refractive index.

It is preferable that surfactants, softening agents, and softening lubricating agents are added to the layer of a lower refractive index of the present invention. By such action, abrasion resistance is enhanced. Of these, preferred are anionic or nonionic surfactants. For example, preferred are dialkylsulfosuccinic acid sodium salts and emulsions of nonionic surfactants comprised of polyhydric alcohol fatty acid esters. For example, employed are Lypo Oil NT-6, NT-12, NT-33, TC-1, TC-68, TC-78, CW-6, TCF-208, TCF-608, NK Oil CS-11, AW-9, AW-10, and AW-20, Polysofter N-606, and Paint Additive PC-700 (all manufactured by Nicca Chemical Co., Ltd.).

It is preferable that the layer of a low refractive index according to the present invention is provided by coating minute silicon compound particles such as silicon oxide or minute fluorine-containing compound particles. Listed as preferred organic silicon compounds may be tetramethoxysilane, tetraethoxysilane, methyltrimethoxysilane, methyltriethoxysilane, ethyltrimethoxysilane, and ethyltriethoxysilane. Silicate oligomers are prepared by hydrolyzing these. It is possible to conduct a hydrolysis reaction employing methods known in the art. For example, a specified amount of water is added to the aforesaid tetraalkoxysilane and the resulting mixture undergoes reaction at room temperature –100° C. in the presence of catalysts while distilling out alcohols which are formed as a by-product. Through this reaction, alkoxysilane undergoes hydrolysis and subsequently undergoes condensation reaction whereby it is possible to prepare a liquid silicate oligomer (customarily, the average degree of polymerizations is 2-8 and preferably 3-6) as a hydrolysis product.

Listed as curing catalysts may be acids, alkalis, organic metals, and metal alkoxides. In the present invention, preferably employed are acids, especially organic acids having a sulfonyl group or a carboxyl group. For example, employed are acetic acid, polyacrylic acid, benzenesulfonic acid, para-toluenesulfonic acid, and methylsulfonic acid. It is more preferable that the aforesaid organic acids comprise a hydroxyl group as well as a carboxyl group in one molecule. For example, employed are hydroxydicarboxylic acids such as citric acid or tartaric acid. Further, it is more preferable that the organic acids are water-soluble. Other than aforesaid citric acid and tartaric acid, preferably employed are, for example, levulinic acid, oxalic acid, propionic acid, malic acid, succinic acid, methylsuccinic acid, fumaric acid, oxalacetic acid, pyruvic acid, 2-oxoglutaric acid, glycolic acid, D-glyceric acid, D-gluconic acid, maleic acid, oxalic acid, isocitric acid, or lactic acid. Further, suitably employed may be benzoic acid, hydroxybenzoic acid, and atrophic acid.

By employing the aforesaid organic acids it is possible to overcome drawbacks such as corrosion of piping and safety degradation due to the use of inorganic acids such as sulfuric acid, hydrochloric acid, nitric acid, hypochlorous acid, or boric acid. In addition, since no gelling occurs during hydrolysis, it is possible to consistently prepare the desired hydrolyzed products. The added amount is 0.1-10 parts by weight with respect to the hydrolyzed products, and is more preferably 0.2-5 parts by weight. Further, the added amount of water is to be at least an amount which is capable of theoretically hydrolyzing compounds to be partially hydrolyzed at a ratio of 100 percent. In practice, water is added preferably at a level of 100-300 percent with respect to 100 percent hydrolysis and is more preferably 100-200 percent.

The coating composition for the layer of a low refractive index, prepared as above, is very stable.

(Ripening Process)

Further, in the present invention, by employing a ripening process, organic silicon compounds undergo hydrolysis and condensation to result in sufficient crosslinking, whereby the resulting layer exhibits excellent characteristics. Ripening is carried out by allowing an oligomer liquid to stand, and the oligomer liquid is allowed to stand for a time in which the aforesaid crosslinking result in the desired layer characteristics. In practice, depending on the type of catalysts, when hydrochloric acid is used, the standing time is at least one hour at room temperature, while when maleic acid is used, the standing time is more than several hours, and 8 hours —approximately one week is usually sufficient, and is commonly about 3 days. Ripening temperature affects ripening time and in a very cold environment, it is occasionally recommended to heat the liquid to approximately 20° C. Generally, at high temperature, the ripening proceeds rapidly. However, when heated to 100° C. or higher, gelling occurs. It is appropriate to heat the liquid to 50-60° C. as the highest temperature range. Further, other than the foregoing, silicate oligomers employed in the invention may be modified ones which are modified with organic compounds (monomers, oligomers, and polymers) having a functional group such as an epoxy group, an amino group, an isocyanate group, or a carboxyl group. Silicate oligomers may be employed individually or in combinations with the aforesaid silicate oligomers.

Further, in the present invention, it is possible to incorporate minute silicon oxide particles into the aforesaid layer of a low refractive index. It is preferable that minute silicon oxide particles of a diameter of 0.1 μm or less are incorporated. For example, it is possible to incorporate Aerosil 200V (manufactured by Nippon Aerosil Co., Ltd.). Particularly, preferably employed are minute silicon oxide particles of which surface is modified by an alkyl group. It is possible to preferably add commercially available products such as Aerosil R972 or R972V (manufactured by Nippon Aerosil Co., Ltd.) which is comprised of minute silicon oxide particles of which surface is modified by a methyl group. Other than these, it is possible to use minute silicon oxide particles of which surface is substituted with a methyl group, described in JP-A No. 2001-2799. It is possible to easily prepare the aforesaid particles by a treatment of alkylsilane coupling agent products which have been prepared by hydrolyzing the aforesaid silicate oligomers. It is preferable that the added amount is controlled to be in the range of 0.1-40 percent by weight with respect to the solids in the layer of a low refractive index.

In order to adjust the refractive index or to improve the layer quality, it is possible to further incorporate silane compounds into each of the layers of a different refractive index.

Listed as solvents, which are employed in liquid coating compositions which are employed to coat each of the layers of a low to high refractive index (also designated as an optical interference layer) are alcohols such as methanol, ethanol, 1-propanol, 2-propanol, or butanol; ketones such as acetone, methyl ethyl ketone, or cyclohexanone; aromatic hydrocarbons such as benzene, toluene, or xylene; glycols such as ethylene glycol, propylene glycol, or hexylene glycol; glycol ethers such as methyl cellosolve, butyl cellosolve, ethylcarbitol, butylcarbitol, diethyl cellosolve, diethylcarbitol, propylene glycol, or monomethyl ether; and N-methylpyrrolidone, dimethylformamide, methyl lactate, ethyl lactate, and water. These may be employed individually or in combinations of at least two types.

Solvents which have an ether bond in the molecule are particularly preferred and of them, glycol ethers are more preferred.

Listed as glycol ethers are propylene glycol monoalkyl (having 1-4 carbon atoms) ethers, propylene glycol monoalkyl (having 1-4 carbon atoms) and ether esters, while listed as specific examples are propylene glycol monomethyl ether (PGME), propylene glycol monoethyl ether, propylene glycol mono-n-propyl ether, propylene glycol monoisopropyl ether, and propylene glycol monobutyl ether. Further, particularly listed as propylene glycol monoalkyl (having 1-4 carbon atoms) ether esters are propylene glycol monoalkyl ether acetates, while listed as specific examples are propylene glycol monomethyl ether acetate and propylene glycol monoethyl ether acetate. The added amount of these solvents in liquid coating compositions is preferably 1-90 percent by weight of the total organic solvents.

Further, it is preferable that various types of low surface tension compounds such as leveling agents, surfactants, and silicone oils are added to the liquid coating composition of each layer of a low to high refractive index.

After coating layers of a medium-high refractive index and layers of a low refractive index, it is preferable that actinic radiation is exposed to promote hydrolysis or curing of compositions comprising metal alkoxides. It is more preferable that after coating each of the layers, actinic radiation is applied.

It is possible to generate actinic radiation employed in the present invention, employing the same radiation sources which are employed to cure inks. Exposure conditions vary depending on type of lamp. However, the exposure amount is preferably 20-10,000 mJ/cm$^2$, is more preferably 100-2,000 mJ/cm$^2$, and is most preferably 400-2,000 mJ/cm$^2$.

When ultraviolet radiation is used, each of the multilayer anti-reflection layers may be exposed, or exposed after coating. However, it is preferable that after coating the multilayer, ultraviolet radiation is applied.

Further, in the present invention, preferably employed may be a method in which an anti-reflection layer is provided employing dry processes. It is possible to form an anti-reflection layer or a stain minimizing layer employing the methods described, for example, in JP-A Nos. 7-333404, 11-133205, 11-61406, and 2002-228803. However, in the present invention, it is particularly preferable that the anti-reflection layer is formed employing an atmospheric pressure plasma processing method.

The production method of the anti-glare film of the present invention will now be described.

Figure 8:
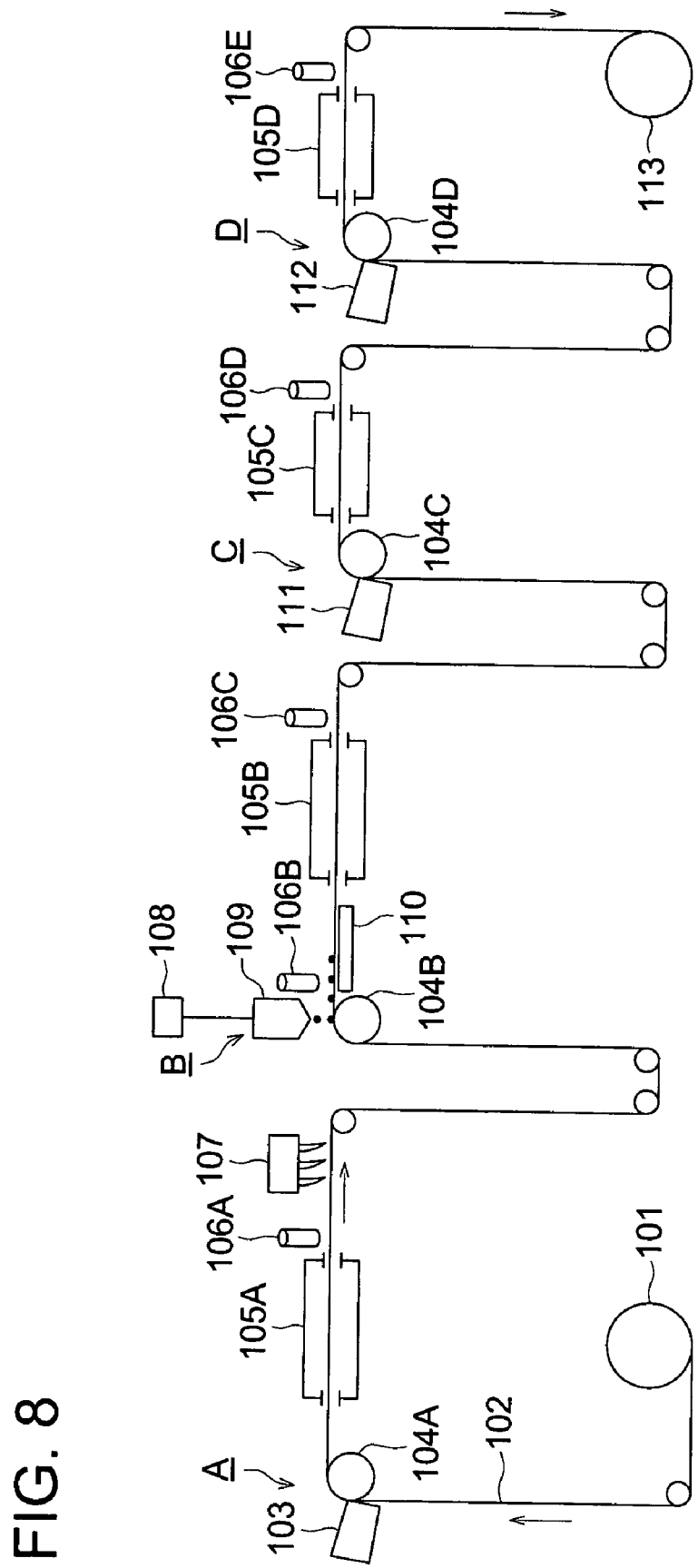
FIG. 8 is a schematic view showing one example of the production flow in which an anti-glare film is produced while providing an anti-glare layer onto a transparent support, employing an ink-jet system.

FIG. 8 is a schematic view showing one example of the production flow of an anti-glare film by providing an anti-glare layer on a transparent substrate, employing an ink-jet system. More specifically, FIG. 8 shows a production flow in which after applying a hard coat layer onto a transparent substrate employing a coating system, an anti-glare layer of a roughened structure is formed employing an ink-jet system, and subsequently, a plurality of anti-reflection layers are provided employing a coating system, whereby an anti-glare film is produced.

In FIG. 8, transparent substrate 102 unwound from wound roll 101 is conveyed, and at first coater station A, a hard coat layer is applied onto it, employing first coater 103 of an extrusion system with back roller 104A. During such operation, the hard coat layer may be comprised of a single layer or a plurality of layers. Subsequently, transparent substrate 102 coated with the hard coat layer is dried in drying zone 105A. Warmed air, subjected to temperature and humidity control, is blown on both sides of transparent substrate 102, whereby drying is conducted. After drying, when actinic radiation curable resins are employed as a binder in the hard coat layer, it is possible to achieve curing by exposure to actinic radiation such as ultraviolet radiation in actinic radiation exposure section 106A, or to result in a semi-cured state by controlling the exposure amount or exposure conditions.

Figure 4:
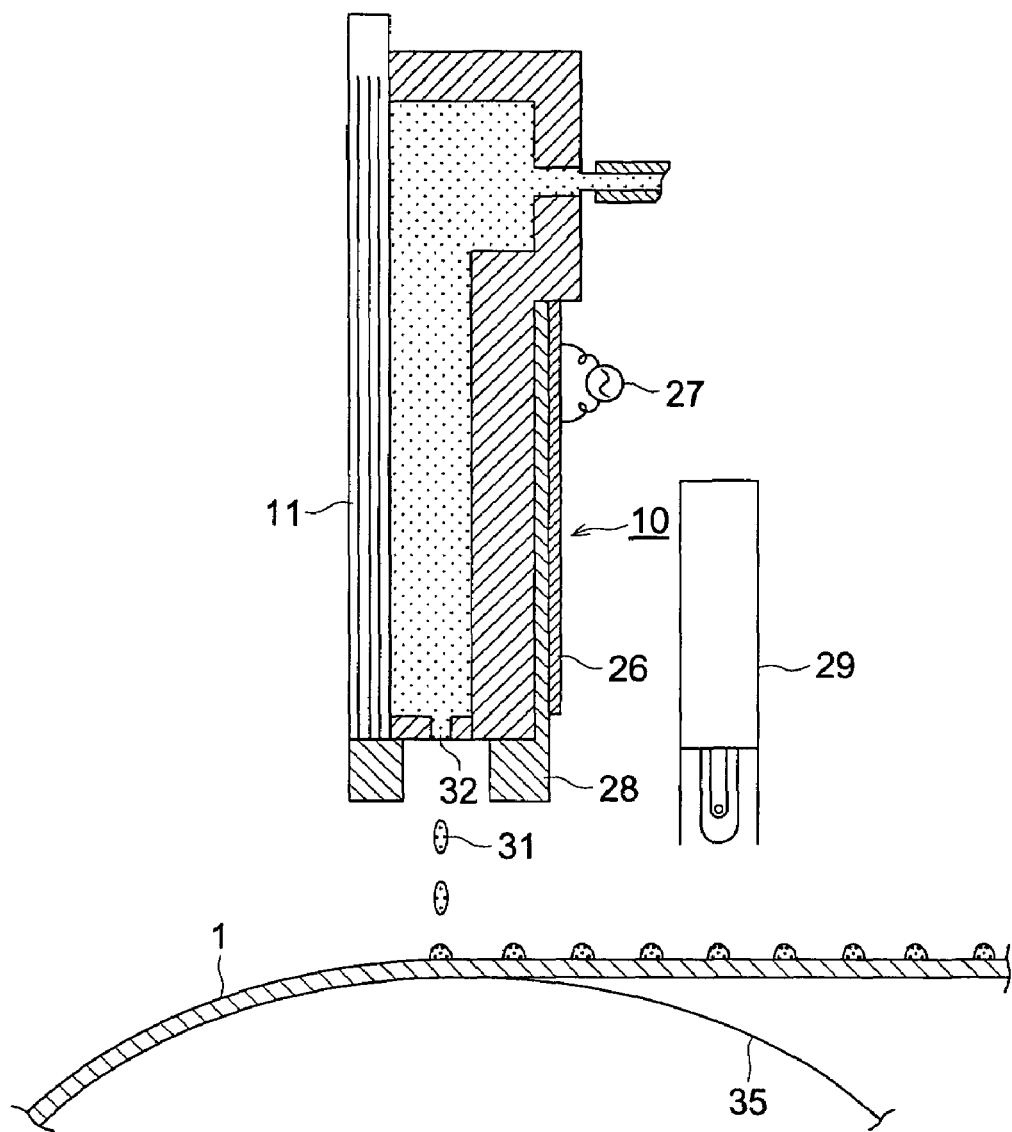
FIG. 4(a) and (b) are each a schematic view showing one example of an ink-jet head section and a nozzle plate usable in the present invention.
Figure 4:
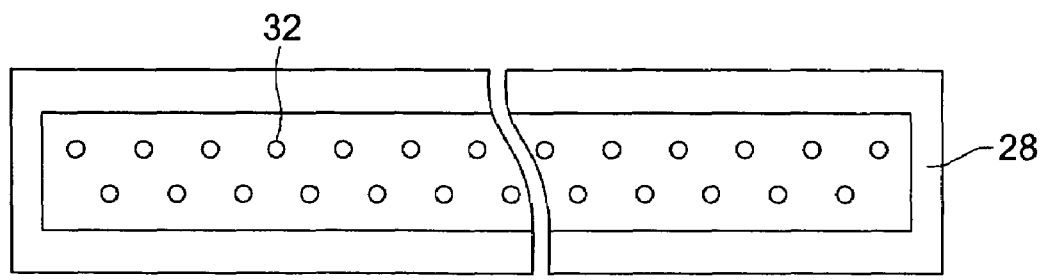

Subsequently, the resulting transparent substrate is conveyed to second coater station B, which provides an anti-glare layer employing an ink-jet system. In such an occasion, it is preferable that the hard coat layer is in a semi-cured state. Alternatively, it is preferable that prior to formation of the anti-glare layer, a surface treatment is carried out in plasma treatment section 107. Ink supply tank 108 is connected to ink ejection section 109, and ink is fed from it. In ink ejection section 109, as shown in FIG. 4(*b*), a plurality of ink-jet nozzles is arranged in a zigzag fashion across the entire width of the transparent substrate, and ink droplets are ejected onto the hard coat layer, whereby a roughened structure is formed on its surface. Further, when at least two types of ink droplets are ejected, each type of ink droplet may be ejected from ink-jet nozzles which are arranged in at least two rows, or ink droplets may be randomly ejected from optional ink-jet nozzles. Further, by arranging a plurality of ink ejection sections, different kinds of ink droplets may be ejected from each ink ejection section. In the present invention, microscopically liquid droplets of a volume of 0.1-100 pl, in some cases, of 0.1-10 pl, are ejected. As a result, flight of ink droplets is easily affected by external airflow. Therefore, it is preferable that entire second coater station B is covered with partitions to achieve a wind break. Further, in order to deposit microscopically liquid droplets of a volume of at most 1 pl at high accuracy, a method is preferred in which voltage is applied between ink ejection 109 and transparent substrate 102, or alternatively back roller 104B to provide charge to ink droplets whereby stable flight of ink droplets is electrically assisted. Further, in order to minimize deformation of deposited ink droplets, it is preferable to use a method in which a transparent substrate is cooled so that the fluidity of ink droplets immediately after deposition is quickly lowered. In order to form a further microscopically roughened structure, it is also preferable that by evaporating solvents incorporated into ink droplets during the duration from ejection to deposition, ink droplets are deposited in which the amount of incorporated solvents decrease. To achieve the foregoing, a method is preferred in which the temperature in the space of ink flght is raised or the ambient pressure is controlled to be lower than one atmospheric pressure such as 20-100 kPa.

Ink droplets deposited on the surface of the hard coat layer, when comprised of actinic radiation curable resins, are cured by exposure to actinic radiation such as ultraviolet radiation, employing actinic radiation exposure section 106B installed immediately following ink ejection section 109. Further, when ink droplets are comprised of heat curable resins, ink droplets are heated and cured employing heating section 110, employing such means as a heating plate. Further, a method is preferred in which heating is carried out employing back roller 104 B as a heating roller.

In second coater station B, it is preferable that in order to minimize direct effects of exposure radiation from actinic radiation exposure section 106B to ink-jet nozzles of ink ejection section 109, actinic radiation exposure section 106B and ink ejection section 109 are arranged at an appropriate distance, or a light shield is arranged between actinic radiation exposure section 106B and ink ejection section 109.

Further, in order to minimize direct effects of heat generated by heating section 110 on ink-jet nozzles of ink ejection section 109, it is preferable that ink-jet ejection section 109 is covered with a heat insulating cover, or as shown in FIG. 8, heating section 110 is arranged on the rear surface side of transparent substrate 102 so that ink ejection section 109 is not affected by heat.

Transparent substrate 102, on which a roughened structure formed by deposition of ink droplets are cured at a level to enable maintaining the structure is dried in drying zone 105B to evaporate unnecessary solvents. Thereafter, resulting transparent substrate 102 is further exposed to actinic radiation in actinic radiation exposure section 106C to complete curing.

Transparent substrate 102 provided with an anti-glare layer is conveyed to third coater station C (with coater 111, back roller 104C, drying zone 105C, and actinic radiation exposure section 106D), when a plurality of anti-reflection layers are provided, to fourth coater station D with coater 112, back roller 104D, drying zone 105D and actinic radiation exposure section 106D), or fifth coater station (not shown), and is subjected to coating, drying, and curing in the same manners as in first coater station A, whereby an anti-glare film is prepared. Thereafter, the resulting film is wound to form wound roll 113.

In FIG. 8, shown as an anti-reflection layer forming method is a coating system. However, instead of using the coating system, the anti-reflection layer or a stain minimizing layer may be formed employing an atmospheric pressure plasma treatment method.

It is possible to preferably use the anti-glare film prepared as above as a polarizing plate protective film. The anti-glare film is placed on at least one side of a polarizer and adhered to it, whereby a polarizing plate is prepared. In addition, the anti-glare film is useful as a front surface plate of various types of display apparatuses such as organic EL displays or plasma displays.

The polarizing plates employing the anti-glare film of the present invention and display apparatuses using the same will now be described.

Employed as polarizers used in the polarizing plates may be those known in the art. Polarizers as described herein, refer to elements which only transmit light of the plane of polarization in a definite direction. The representative polarizers currently known are polyvinyl alcohol based polarizing films which include a polyvinyl alcohol film dyed with iodine, and a polyvinyl alcohol film dyed with dichroic dyes. Employed are those prepared in such a manner that an aqueous polyvinyl alcohol solution is cast in the form of film, and the resulting film is uniaxially oriented and then dyed, or is dyed, then uniaxially oriented and subsequently is preferably subjected to a durability enhancing treatment employing boron compounds.

A polarizing plate is prepared by adhering the polarizer prepared as above to the anti-glare film of the present invention. Alternatively, a polarizer may be provided on the reverse surface of the anti-glare film, employing a coating means.

It is possible to prepare the polarizing plates according to the present invention, employing common methods. For example, there is a method in which the anti-glare film of the present invention is subjected to an alkali treatment and adhered to both surfaces of a polarizing film which has been immersed in an iodine solution, and oriented employing an aqueous solution of completely saponified polyvinyl alcohol. The alkali saponification treatment, as described herein, refers to the treatment in which a cellulose ester film is immersed in a strong alkali solution at high temperature so that wetability of the resulting aqueous adhesive is enhanced to improve adhesion property. In such cases, by providing a re-peeling protective film (comprised of, for example, polyolefin resins such as polyethylene or polyester resins such as polyethylene terephthalate) on the surface of the anti-reflection layer, it is possible to protect the polarizing plate from alkali as well as stains.

When the anti-glare film is employed as a protective film on one polarizing plate, it is possible to allow a protective film of the other polarizing plate to achieve an optical compensation function. For example, an optical anisotropic film (e.g., a hybrid orientation fixed layer), which is prepared by coating liquid crystals directly or via orientation, and by orienting and fixing the resulting coating, is employed as the protective film of the polarizing plate, whereby it is possible to prepare a polarizing plate which results in an increase in visible angle.

Further, if desired, it is possible to make the surface of the anti-glare layer stain resistant or to provide a stain minimizing layer. A 1-30 nm thick stain minimizing layer is preferably employed which is prepared employing prior art compounds such as silicone or fluorine based compounds.

The configuration of a representative polarizing plate is described below.

Stain minimizing layer/anti-reflection layer/anti-glare layer/cellulose ester film/polarizer/cellulose ester film/orientation layer/optical anisotropic layer (liquid cell side)

The polarizing plate prepared as above may be provided on one surface or both surfaces of a liquid crystal cell. The anti-glare film of the present invention may be adhered to a liquid cell so that the anti-reflection layer faces outside. By employing the anti-glare film of the present invention, it is possible to provide a display apparatus which results in excellent visibility and also exhibits high detail.

EXAMPLES

The constitution and effects of the present invention will now be specifically described with reference to examples. However, the present invention is not limited thereto.

Example 1

<<Preparation of Transparent Substrates>>

Various additive liquid compositions and various dopes were prepared as described below and cellulose ester films were prepared as a transparent substrate.

(Preparation of Cellulose Ester Film)

<Preparation of Silicon Oxide Dispersion A>

| | |
|---|---|
| Aerosil R972V (manufactured by Nippon Aerosil Co., Ltd.) | 1 kg |
| Ethanol | 9 kg |

After mixing the above components while stirring for 30 minutes employing Dissolver, the resulting mixture was dispersed employing a Manton-Gaulin type high pressure homogenizer, whereby Silicon Oxide Dispersion A was prepared.

<Preparation of Addition Composition B>

| | |
|---|---|
| Cellulose triacetate (degree of substitution of an acetyl group of 2.88) | 6 kg |
| Methylene chloride | 140 kg |

The above components were placed in a sealable vessel, stirred while heated until completely dissolved and then filtered. While stirring, added to the resulting solution was 10 kg of aforesaid Silicon Oxide Dispersion A. The resulting mixture was stirred for an additional 30 minutes, and then filtered, whereby Addition Composition B was prepared.

<Preparation of Dope C>

| Methylene chloride | 440 kg |
| Methanol | 35 kg |
| Cellulose triacetate (degree of substitution of a acetyl group of 2.88) | 100 kg |
| Triphenyl phosphate | 10 kg |
| Ethylphthalylethyl glycolate | 2 kg |
| Tinuvin 326 (manufactured by Ciba Specialty Chemicals Inc.) | 0.3 kg |
| Tinuvin 109 (manufactured by Ciba Specialty Chemicals Inc.) | 0.5 kg |
| Tinuvin 171 (manufactured by Ciba Specialty Chemicals Inc.) | 0.5 kg |

The aforesaid solvents were placed in a sealable vessel. Subsequently, the other components were added to the solvents while stirring and were completely dissolved while stirred and heated. The resulting composition was cooled to the temperature at which the dope was castable and was left standing overnight. After being subjected to a defoaming operation, the resulting solution was filtered employing Azumi Filter No.244, manufactured by Azumi Filter Co., Ltd. Further, 3 kg of Addition Composition B was added to the filtrate, mixed for 10 minutes employing an in-line mixer (a static type in-line mixer Hi-Mixer SWJ, manufactured by Toray Industries, Inc.), and then filtered, whereby Dope C was prepared.

After filtration, Dope C at 35° C. was uniformly cast onto a stainless steel band support also heated to 35° C., employing a belt casting apparatus. Thereafter, the cast dope was dried on the support and the resulting film was peeled from the stainless steel band support. At this time, the amount of residual solvents in the film was 80 percent. This figure ca be calculated by the formula, $((M-N)/M) \times 100$; M: an initial amount of solvent; N: an amount of eliminated solvent).

After peeling from the stainless steel band support, the film was dried for one minute in an 80° C. drying zone and subsequently oriented longitudinally by a factor of 1.03 and laterally by a factor of 1.1 at 100° C. at a ratio of the amount of residual solvent is 3-10 percent by weight, employing a biaxially orienting tenter. After release from width maintaining, drying was completed in a 125° C. drying zone while the film was conveyed by numerous rollers. Subsequently, the resulting film was subjected to a knurling treatment to a width of 10 mm and a height of 10 µm at both sides of the film, whereby an 80 µm thick cellulose ester film was prepared.

<<Preparation of Anti-Glare Film 1>>

(Coating of a Hard Coat Layer)

The hard coat layer coating composition, described below, was applied onto one surface of the cellulose ester film, prepared as above, employing a slit die and dried at a final temperature of 85° C. while gradually creasing the temperature and flow rate of blown hot air. Subsequently, the resulting film was exposed to ultraviolet radiation emmited from an actinic radiation exposure section at an intensity of 115 mJ/cm$^2$, whereby a hard coat layer was provided which had a dried layer thickness of 5 µm and a center line mean surface roughness (Ra) of 12 nm.

<Hard Coat Layer Coating Composition>

| Dipentaerythritol hexaacrylate monomer | 60 weight parts |
| Dipentaerythritol hexaacrylate dimmer | 20 weight parts |
| Dipentaerythritol hexaacrylate trimer and higher components | 20 weight parts |
| Dimethoxybenzophenone photoreaction initiator | 4 weigh parts |
| Propylene glycol monomethyl ether | 75 weight parts |
| Methyl ethyl ketone | 75 weight parts |

(Formation of an Anti-Reflection Layer)

As an anti-reflection layer, a layer of a medium refractive index, a layer of a high refractive index, and a layer of a low refractive index were applied onto the hard coat layer prepared as above in the stated order, whereby Anti-glare Film 1 was prepared.

(Coating of a Layer of a Medium Refractive Index)

The medium refractive index layer composition, described below, was applied onto the hard coat layer of a cellulose ester film, employing an extrusion coater and dried at 80° C. for 5 minutes. Thereafter, the resulting coating was cured be exposure to ultraviolet radiation of 175 mJ/cm$^2$ employing a high pressure mercury lamp (80 W). Thus a 78 nm thick layer of a medium refractive index was provided. Incidentally, the refractive index of the resulting layer of a medium refractive index was 1.70.

<Medium Refractive Index Layer Composition>

| Isopropyl alcohol | 510 weight parts |
| Water | 2 weight parts |
| Propylene glycol monomethyl ether | 227 weight parts |
| Methyl ethyl ketone | 84 weight parts |
| Tetra (n) butoxy titanium | 39 weight parts |
| γ-methacryloxypropyltrimethoxysilane (KBM503, manufactured by Shin-Etsu Chemical Co., Ltd.) | 6 weight parts |
| 5 Percent acryl resin solution (Dyanal BR-102, manufactured by Mitsubishi Rayon Co., Ltd., dissolved in propylene glycol monomethyl ether as a solvent) | 31 weight parts |
| 10 Percent silicone oil (KF-96-1,000CS, manufactured by Shin-Etsu Chemical Co., Ltd., solvent methyl ethyl ketone) | 1.5 weight parts |

(Formation of a Layer of a High Refractive Index)

The high refractive index layer composition described below was applied onto the aforesaid layer of a medium refractive index, employing an extrusion coater and subsequently dried at 80° C. for 5 minutes. Thereafter, the resulting coating was cured by exposure to ultraviolet radiation of 175 mJ/cm$^2$, employing a high pressure mercury lamp (80 W), whereby a layer of a high refractive index was provided to achieve a thickness of 66 nm. Incidentally, the refractive index of the aforesaid layer of a high refractive index was 1.85.

<High Refractive Index Layer Composition>

| Isopropyl alcohol | 445 weight parts |
| Water | 1.5 weight parts |
| Propylene glycol monomethyl ether | 223 weight parts |
| Methyl ethyl ketone | 73 weight parts |
| Tetra(n)butoxy titanium | 545 weight parts |

-continued

| | |
|---|---|
| γ-methacryloxypropyltrimethoxysilane (BM503, manufactured by Shin-Etsu Chemical Co., Ltd.) | 0.8 weight part |
| 10 Percent silicone oil (KF-96-1,000CS, manufactured by Shin-Etsu Chemical Co., Ltd., solvent: methyl ethyl ketone) | 1.4 weight parts |

(Formation of a Layer of a Low Refractive Index)

The low refractive index layer composition described below was applied onto the aforesaid layer of a high refractive index, employing an extrusion coater and subsequently dried at 80° C. for 5 minutes. The resulting coating was heat-cured at 120° C. for 5 minutes and was further cured by exposure to ultraviolet radiation of 175 mJ/cm$^2$, whereby a layer of a low refractive index was provided to achieve a thickness of 95 nm. Incidentally, the refractive index of the aforesaid layer of a low refractive index was 1.45.

<Preparation of Tetraethoxysilane Hydrolysis Product A>

An aqueous citric acid solution (prepared by dissolving 5.4 g of citric acid monohydrate in 272 g of water) was added to a mixture consisting of 580 g of tetraethoxysilane and 1,144 g of methanol. The resulting mixture was stirred for one hour at room temperature (25° C.), whereby Tetraethoxysilane Hydrolysis Product A was prepared.

<Low Refractive Index Layer Composition>

| | |
|---|---|
| Propylene glycol monomethyl ether | 303 weight parts |
| Isopropyl alcohol | 305 weight parts |
| Tetraethoxysilane Hydrolysis Product A | 139 weigh parts |
| γ-Methacryloxypropyltrimethoxysilane (BM503, manufactured by Shin-Etsu Chemical Co., Ltd.) | 1.6 weight parts |
| 10 Percent FZ-2207 propylene glycol monomethyl ether solution (manufactured by Nippon Unicar Co., Ltd.) | 1.3 weight parts |

<<Preparation of Anti-Glare Film 2>>

Anti-glare Film 2 was prepared in the same manner as Anti-glare Film 1 above, except that the anti-glare film described below was formed employing a coating system and subsequently, the anti-reflection layer described above was provided.

(Coating of an Anti-Glare Layer)

The anti-glare layer coating composition, described below, was applied onto the hard coat layer to achieve a 10 μm thick wet layer, employing a slit die, and dried at a final temperature of 85° C. while gradually increasing the temperature and flow rate of blown hot air. Subsequently, the resulting film was exposed to ultraviolet radiation emitted from an actinic radiation exposure section at an intensity of 115 mJ/cm$^2$, whereby an anti-glare layer was provided which had a dried layer thickness of 5 μm.

<Anti-Glare Layer Coating Composition>

| | |
|---|---|
| Dipentaerythritol hexaacrylate monomer | 60 weight parts |
| Dipentaerythritol hexaacrylate dimmer | 20 weight parts |

-continued

| | |
|---|---|
| Dipentaerythritol hexaacrylate trimer and higher components | 20 weight parts |
| Synthesis silica particles (an average particle diameter of 1.8 μm) | 8 weight parts |
| Dimethoxybenzophenone photoreaction initiator | 4 weigh parts |
| Propylene glycol monomethyl ether | 75 weight parts |
| Methyl ethyl ketone | 75 weight parts |

<<Preparation of Anti-Glare Film 3>>

Anti-glare Film 3 was prepared in the same manner as Anti-glare Film 1 above, except that after coating the hard coat layer, the anti-glare layer, described below, was formed employing an ink-jet system, and subsequently, the anti-reflection layer, described above, was provided.

(Formation of an Anti-Glare Layer)

Anti-glare Layer Ink Liquid 1, described below, was ejected onto the hard coat layer at an ink droplet volume of 1 pl, employing an ink-jet system, and after 0.2 second, was cured by exposure to ultraviolet radiation at an intensity of 100 mJ/cm$^2$, in the actinic radiation exposure section. The cured ink droplets were dried at a final temperature of 85° C. while gradually increasing the temperature and flow rate of blown hot air. In addition, ultraviolet radiation at an intensity of 100 mJ/cm$^2$ was applied, whereby an anti-glare layer was formed which exhibited a central line mean roughness (Ra) of 2 μm and had per 100 m$^2$ one convex portion of a height of 0.5-10.0 μm, which was determined by employing the bottom of the concave portion as a standard.

<Ink Ejection Method>

An ink ejection apparatus provided with the line head system (shown in FIG. 4(a)) was used and 10 ink-jet heads comprising the specified number of 3.5 μm diameter nozzles were used. The ink-jet head, shown in FIG. 3, was employed.

The ink supply system was comprised of an ink supply tank, a filter, a piezoelectric type ink-jet head, and piping. The portion from the ink supply tank to the ink-jet head was insulated from heat and heated (40° C.). Ink ejection was carried out at an ejection temperature of 40° C. and a drive frequency of 20 kHz.

<Composition of Anti-Glare Layer Ink Liquid 1>

| | |
|---|---|
| Dipentaerythritol hexaacrylate (including dimers and trimers or higher components) | 100 weight parts |
| Photoreaction initiator (dimethoxybenzophenone) | 4 weight parts |
| Propylene glycol monomethyl ether | 30 weight parts |
| Methyl ethyl ketone | 100 weight parts |

<<Preparation of Anti-Glare Films 4-9>>

Anti-glare Films 4-9 were prepared in the same manner as aforesaid Anti-glare Film 3, except that the types of anti-glare ink liquid (aforesaid Anti-glare Layer Ink Liquid 1 as well as Anti-glare Layer Ink Liquids 2 and 3), and the volume of ink droplets were varied as shown in Table 1.

<Composition of Anti-Glare Layer Ink Liquid 2>

| | |
|---|---|
| Dipentaerythritol hexaacrylate (including dimers and trimers or higher components) | 100 weight parts |

-continued

| | |
|---|---|
| Photoreaction initiator (dimethoxybenzophenone) | 4 weight parts |
| Acetone | 900 weight parts |
| Isopropyl alcohol | 10 weight parts |
| Ethyl acetate | 10 weight parts |

<Composition of Anti-Glare Layer Ink Liquid 3>

| | |
|---|---|
| Dipentaerythritol hexaacrylate (including dimers and trimers or higher components) | 100 weight parts |
| Photoreaction initiator (dimethoxybenzophenone) | 4 weight parts |
| Acetone | 10,000 weight parts |
| Isopropyl alcohol | 5 weight parts |
| Ethyl acetate | 5 weight parts |

<<Preparation of Anti-Glare Film 10>>

Anti-glare Film 10 was prepared in the same manner as aforesaid Anti-glare Film 9, except that Anti-glare Layer Ink Liquid 3 was further ejected onto the anti-glare film under the conditions of an ink droplet volume of 0.1 pl, and was cured similarly under exposure of ultraviolet radiation, whereby a more microscopically roughened structure was formed.

<<Preparation of Anti-Glare Film 11>>

Anti-glare Film 11 was prepared in the same manner as aforesaid Anti-glare Film 8, except that the anti-glare layer was formed under the state in which the hard coat layer was semi-cured.

<<Preparation of Anti-Glare Film 12>>

Anti-glare Film 12 was prepared in the same manner as aforesaid Anti-glare Film 8, except that one part by weight of triphenyl phosphate was added to the hard coat layer liquid coating composition as a plasticizer.

<<Preparation of Anti-Glare Film 13>>

Anti-glare Film 13 was prepared in the same manner as aforesaid Anti-glare Film 8, except that prior to formation of the anti-glare layer employing an ink-jet system, the hard coat layer was subjected to a surface treatment of plasma discharge at a high frequency voltage of 100 kHz under an atmospheric pressure of nitrogen gas containing 1 percent of oxygen, and subsequently the anti-glare layer was formed employing an ink-jet system.

<<Preparation of Anti-Glare Film 14>>

Anti-glare Film 14 was prepared in the same manner as aforesaid Anti-glare Film 11, except that one part by weight of approximately 12 nm gas-phase process silica particles (Reoseal QS-20, manufactured by Tokuyama Corp.) was added to Anti-glare Layer Ink Liquid 1.

<<Preparation of Anti-Glare Film 15>>

Anti-glare Film 15 was prepared in the same manner as aforesaid Anti-glare Film 11, except that 20 parts by weight of tetraethoxysilane hydrolysis product described below were added to Anti-glare Layer Ink Liquid 1. (Tetraethoxysilane Hydrolysis Product: contained in ink as a minute liquid droplet)

Mixed were 580 parts by weight of tetraethoxysilane and 1,100 parts by weight of ethanol, and a solution prepared by dissolving 5.4 parts by weight of citric acid 1.5 hydrate in 300 parts by weight of water was added. The resulting mixture was stirred at room temperature for one hour to prepare a tetraethoxysilane hydrolysis product.

<<Preparation of Anti-Glare Film 16>>

Anti-glare Film 16 was prepared in the same manner as aforesaid Anti-glare Film 11, except that during formation of the anti-glare layer, ink droplets of 0.5 pl and 0.3 pl were simultaneously ejected.

<<Preparation of Anti-Glare Film 17>>

Anti-glare Film 17 was prepared in the same manner as aforesaid Anti-glare Film 11, except that ink droplets of 0.5 pl were ejected and after one second of actinic radiation exposure, ink droplets of 0.3 pl were ejected and similarly cured.

<<Preparation of Anti-Glare Film 18>>

Anti-glare Film 18 was prepared in the same manner as aforesaid Anti-glare Film 11, except that the exposure timing of actinic radiation during formation of the anti-glare layer was changed to 4 seconds after deposition of ink droplets.

TABLE 1

| | | Forming Method of Anti-Glare Layer | | | | | | | Surface Characteristics | | |
|---|---|---|---|---|---|---|---|---|---|---|---|
| | Feature of | | | Ink | | | | Second Ejection Ink | | Surface | |
| Anti-Glare Film No. | Hard Coat Layer of Lower Layer | Forming Method | Ink Type | Droplet Volume (pl) | Filler of Ink Liquid | UV Exposure Time (seconds) | Ink Type | Ink Droplet Volume (pl) | Ejection Timing | Roughness Ra (μm) | *1 | Remarks |
| 1 | Completely cured | — | — | — | — | — | — | — | — | — | — | Comp. |
| 2 | Completely cured | Coating system | — | — | — | — | — | — | — | 0.4 | 1 | Comp. |
| 3 | Completely cured | Ink jet | 1 | 1.0 | — | 0.2 after deposition | — | — | — | 1.0 | 1 | Inv. |
| 4 | Completely cured | Ink jet | 1 | 3.0 | — | 0.2 after deposition | — | — | — | 3.0 | 0.2 | Inv. |
| 5 | Completely cured | Ink jet | 1 | 2.0 | — | 0.2 after deposition | — | — | — | 2.0 | 0.4 | Inv. |
| 6 | Completely cured | Ink jet | 2 | 0.5 | — | 0.2 after deposition | — | — | — | 0.5 | 5 | Inv. |

TABLE 1-continued

| | | | Forming Method of Anti-Glare Layer | | | | | | Surface Characteristics | | |
|---|---|---|---|---|---|---|---|---|---|---|---|
| | | | | Ink | | | Second Ejection Ink | | Surface | | |
| Anti-Glare Film No. | Feature of Hard Coat Layer of Lower Layer | Forming Method | Ink Type | Droplet Volume (pl) | Filler of Ink Liquid | UV Exposure Time (seconds) | Ink Type | Ink Droplet Volume (pl) | Ejection Timing | Roughness Ra (μm) | *1 | Remarks |
| 7 | Completely cured | Ink jet | 3 | 0.1 | — | 0.2 after deposition | — | — | — | 0.1 | 46 | Inv. |
| 8 | Completely cured | Ink jet | 2 | 0.3 | — | 0.2 after deposition | — | — | — | 0.3 | 26 | Inv. |
| 9 | Completely cured | Ink jet | 2 | 0.3 | — | 0.2 after deposition | — | — | — | 0.3 | 28 | Inv. |
| 10 | Completely cured | Ink jet | 2 | 0.3 | — | 0.2 after deposition | 3 | 0.1 | After curing | 0.3 | 41 | Inv. |
| 11 | Semi-cured | Ink jet | 2 | 0.3 | — | 0.2 after depostion | — | — | — | 0.3 | 21 | Inv. |
| 12 | Comprising plasticizers | Ink jet | 2 | 0.3 | — | 0.2 after deposition | — | — | — | 0.3 | 25 | Inv. |
| 13 | Plasma treatment | Ink jet | 2 | 0.3 | — | 0.2 after deposition | — | — | — | 0.3 | 28 | Inv. |
| 14 | Semi-cured | Ink jet | 2 | 0.5 | Silica particles | 0.2 after deposition | — | — | — | 0.3 | 35 | Inv. |
| 15 | Semi-cured | Ink jet | 2 | 0.5 | Minute liquid droplets | 0.2 after deposition | — | — | — | 0.2 | 42 | Inv. |
| 16 | Semi-cured | Ink jet | 2 | 0.5 | — | 0.2 after deposition | 3 | 0.3 | Simultaneously | 0.3 | 12 | Inv. |
| 17 | Semi-cured | Ink jet | 2 | 0.5 | — | 0.2 after deposition | 3 | 0.3 | After one second | 0.3 | 18 | Inv. |
| 18 | Semi-cured | Ink jet | 2 | 0.5 | — | 0.2 after deposition | — | — | — | 0.1 | 10 | Inv. |

*1; Number per 100 μm² of convex portions of height (a) of 0.5-10.0 μm when determined using the bottom of the convex portion as a standard (number of concave portions/100 μm²) (the number of convex portions was determined employing an optical interference type surface roughness meter)
Comp.; Comparative Example
Inv.; Present Invention <<Evaluation of Anti-Glare Films>>

Anti-glare Films 1-18 comprising the anti-reflection layer, prepared as above, were subjected to evaluation for each of the items described below.

(Evaluation of Adhesion Property)

The lattice pattern cutting test was conducted with reference to JIS K 5400. Employing samples at each stage of formation of the anti-glare layer of the resulting anti-glare films, the surface of each sample was laterally and longitudinally cut at an interval of 1 mm for 11 cutting lines to make a lattice of 100 squares. Subsequently, cellophane adhesive tape was adhered onto the resulting lattice pattern and then quickly peeled at an angle of 90 degrees. The number of lattice squares remaining without being peeled was determined and evaluation was based on the ranking below.

A: 100
B: 95-99
C: 90-94
D: 70-89
E: 69 or less

A rank of C or above was judged to be commercially viable.

(Evaluation of Reflection Property)

The color uniformity of light reflected from one m² of each anti-glare film was visually evaluated based on the ranking described below.

[321]
A: No variation of color tone of the reflected light was noticed.
B: Slight variation of color tone of the reflected light was noticed (less than 5 percent of the area).
C: Variation of color tone of the reflected light was noticed in a very small area (between 5 and 10 percent of the area).
D: Localized variation of color tone of the reflected light was noticed (between 10 and 30 percent of the area)
E: Variation of color tone of the reflected light was noticed over the entire area.

(Evaluation of Visibility)

Polarizing plates 1-18 were prepared as described below, employing anti-glare films 1-18. Each of the resulting polarizing plate was integrated in a liquid crystal display panel and visibility was evaluated.

Based on the method described below, a polarizing plate was prepared employing an anti-glare film as well as a sheet of each of the cellulose ester films employed as a support of the aforesaid film as a polarizing plate protective film.

a) Preparation of a Polarizing Film

A continuous 120 μm thick polyvinyl alcohol film was uniaxially oriented (at 110° C. and at an orientation ratio of a factor of 5). The oriented film was immersed for 60 seconds in an aqueous solution consisting of iodine, potassium iodide, and water at weight ratios of 0.075, 5, and 100, respectively, and subsequently immersed in a 68° C. aqueous solution consisting of potassium iodide, boric acid, and water at weight ratios of 6, 7.5, and 100, respectively. The resulting film was washed with water and dried, whereby a continuous polarizing film was prepared.

b) Preparation of Polarizing Plates

Subsequently, a polarizing plate was prepared by adhering the polarizing film to the polarizing plate protective film following processes 1-5 described below.

Process 1: The continuous cellulose ester film and Anti-glare Film 1 were immersed in a 2 mol/L sodium hydroxide solution at 60° C. for 90 seconds, washed with water, and subsequently dried. The side of the anti-glare film on which the anti-reflection layer was provided was protected by previously adhering a peelable protective film (comprised of polyethylene).

In the same manner as above, a continuous cellulose ester film was immersed in a 2 mol/L sodium hydroxide solution at 60° C. for 90 seconds, washed with water, and subsequently dried.

Process 2: The aforesaid continuous polarizing film was immersed for 1-2 seconds in a tank of a polyvinyl alcohol adhesive containing solids of 2 percent by weight.

Process 3: The adhesive which was excessively adhered to the polarizing film in Process 2 was moderately removed, and subsequently, the resulting polarizing film was interposed between the cellulose ester film which had been subjected to an alkali treatment in Process 1 and Anti-glare Film 1, achieving a laminated configuration.

Process 4: Adhesion was carried out employing two rollers rotated at a rate of approximately 2 m/minute under a pressure of 20-30 N/cm². During this operation, care was taken to eliminate all air bubbles.

Process 5: The sample prepared in Process 4 was dried at 80° C. in a dryer, whereby Polarizing Plate 1 of the present invention was prepared.

Polarizing Plates 2-18 were prepared in the same manner as Polarizing Plate 1, except that Anti-glare Film 1 was replaced with each of Anti-glare Film 2-18 which was employed as the polarizing plate protective film on one side.

The polarizing plate on the uppermost surface of a commercially available liquid crystal display panel (Color Liquid Crystal Display MultiSync LCD1525J: Model Name LA-1529HM, manufactured by NEC Corp.) was carefully peeled. Subsequently, each of Polarizing Plates 1-18 was adhered thereon while aligned in the polarization direction.

The liquid crystal panel prepared as above was placed on a table of a height of 80 cm. Subsequently, 10 sets lights in which one set consisted of two daylight straight fluorescent tube lamps (FLR40S·D/M-X, manufactured by Matsushita Electric Industrial Co., Ltd.) were arranged on the ceiling at a height of 3 m from the floor at an interval of 1.5 m. The aforesaid fluorescent lamps were arranged so that when an evaluator person was in the front of the surface of the liquid crystal display, the aforesaid fluorescent lamps were positioned on the ceiling from the position above the head of the evaluator to the backward direction. The liquid crystal panel was declined at an angle of 25 degrees from the vertical direction with respect to the surface of the table so that the image of the aforesaid fluorescent lamps was captured, thereby easing the viewing of images (visibility) was evaluated based on the ranking described below.

A: Image capture of the nearest fluorescent lamp was not completely noticeable and the text at a font size of 8 or less was easily readable.

B: Image capture of the nearest fluorescent lamp was barely noticeable and the text at a font size of 8 or less was readable.

C: Image capture of the near fluorescent lamps was slightly noticeable, while that of more distant fluorescent lamps was not noticeable, and the text at a font size of 8 or less was readable with some difficulty.

D: Image capture of distant fluorescent lamps was noticeable and it was difficult read the text at a font size of 8 or less.

E: Image capture of florescent lamps was noticeable and it was impossible to read any portion of the text at a font size of 8 or less on which fluorescent lamps were captured.

(Evaluation of Image Quality and Sharpness)

An animation image and a sharpness test chart were outputted on each liquid crystal penal prepared for the aforesaid evaluation of visibility, and definition and sharpness of images were evaluated based on the criteria below.

A: Solid black of an animation image was excellent, and the test pattern was very sharply displayed.

B: Solid black of an animation image was good, and even though the sharpness of the high frequency test pattern was slightly degraded, no problems occurred for commercial viability.

C: Solid black of an animation image was slightly degraded, and the degradation of sharpness of the high and medium frequency pattern was noticed. However, no problems existed for commercial viability.

D: Solid black of an animation image was insufficient, and the degradation of sharpness was noticed in all frequency test patterns.

E: Solid black of an animation image was poor and degradation of sharpness was clearly noticed in all frequency test patterns. Problems existed for commercial viability.

TABLE 2

| Anti-glare Film No. | Evaluation of Anti-glare Film | | Evaluation of Polarizing Plate | | Remarks |
|---|---|---|---|---|---|
| | Adhesion Property | Reflection Property | Visibility | Image Quality and Sharpness | |
| 1 | — | E | E | E | Comp. |
| 2 | C | D | D | D | Comp. |
| 3 | B | B | B | B | Inv. |
| 4 | B | B | B | B | Inv. |
| 5 | B | B | B | B | Inv. |
| 6 | B | B | A | A | Inv. |
| 7 | B | B | A | A | Inv. |
| 8 | B | B | A | A | Inv. |
| 9 | B | B | A | A | Inv. |
| 10 | B | B | A | A | Inv. |
| 11 | A | A | A | A | Inv. |
| 12 | A | A | A | A | Inv. |
| 13 | A | A | A | A | Inv. |
| 14 | A | A | A | A | Inv. |
| 15 | A | A | A | A | Inv. |
| 16 | A | A | A | A | Inv. |
| 17 | A | A | A | A | Inv. |
| 18 | B | B | B | B | Inv. |

Comp.; Comparative Example
Inv.; Present Invention

As can clearly be seen from Table 2, anti-glare films of the present invention, in which the anti-glare layer is formed employing an ink-jet system, exhibited excellent adhesion property and layer uniformity compared to comparative examples, and when employed in the liquid crystal panel, image capture was not noticeable, and at the same time, when animation was displayed, excellent solid black as well as high sharpness was exhibited. Of these, Anti-glare Films 6-17 exhibit better results.

According to the present invention, it is possible to provided a method for forming an anti-glare layer which exhibits excellent physical film properties (film uniformity as well as adhesions property), results in excellent anti-glare effect, which exhibits excellent sharpness, visibility, and desired solid black when displaying animation, an anti-glare film and a production method of the same, and an anti-glare layer forming ink-jet apparatus.

What is claimed is:

1. A method for forming an anti-glare layer, comprising the step of:
   (a) ejecting droplets of an ink with an ink-jet apparatus onto a transparent substrate so as to form discontinuous, individual ink droplets on the transparent substrate,
   wherein the ink contains an ingredient capable of giving an anti-glare property to the transparent substrate, and
   wherein the ingredient is an actinic radiation curable resin or a heat curable resin; and
   (b) curing the discontinuous, individual ink droplets to form a microscopically roughened structure of discontinuous ink droplets.

2. The method for forming an anti-glare layer of claim 1, wherein the microscopically roughened structure has a center line mean roughness (Ra) of 0.05-5.0 μm.

3. The method for forming an anti-glare layer of claim 1, wherein the microscopically roughened structure contains 1 to 50 peaks having a height (a) of 0.5 to 10 μm per 100 μm$^2$, provided that each height (a) is determined from a bottom of the peak.

4. The method for forming an anti-glare layer of claim 1, wherein the curing step comprises:
   exposing an actinic radiation on the transparent substrate after the ejection step is finished.

5. The method for forming an anti-glare layer of claim 1, wherein the curing step comprises:
   heating the droplets of the ink on the transparent substrate so as to cure the jetted droplets of the ink.

6. The method for forming an anti-glare layer of claim 1, wherein at least two kinds of inks having different compositions from each other are ejected so as to form peaks of different refractive index.

7. The method for forming an anti-glare layer of claim 1,
   wherein (i) at least two kinds of inks having different compositions from each other are rejected; and
   (ii) the ejected droplets of inks having different compositions have a different particle diameter from each other.

8. The method for forming an anti-glare layer of claim 7, wherein a first microscopically roughened structure is formed on the transparent substrate employing droplets of a first ink, then a second microscopically roughened structure is formed employing droplets of a second ink, a diameter of the droplets produced with the first ink is larger than a diameter of the droplets produced with the second ink.

9. The method for forming an anti-glare layer of claim 1, wherein the ink droplet contains a particle having a smaller diameter than a diameter of the ink droplet.

10. The method for forming an anti-glare layer of claim 9, wherein the particle in the ink droplet is a liquid particle.

11. The method for forming an anti-glare layer of claim 10, wherein a difference of a refractive index between the liquid particle and a medium used in the ink is at least 0.01.

12. The method for forming an anti-glare layer of claim 1, wherein an ink-jet head section in the ink-jet apparatus is subjected to micro-vibration so that ink droplets are randomly deposited onto the transparent substrate during the ink ejection step.

13. The method for forming an anti-glare layer of claim 1, wherein the transparent substrate has at least one hardcoat layer thereon, and the droplets of an in ink is ejected onto the hard-coat layer.

14. The method for forming an anti-glare layer of claim 13, wherein the hard-coat layer is semi-cured, and then the droplets of an ink is ejected onto the semi-cured hard-coat layer.

15. The method for forming an anti-glare layer of claim 13, wherein the hard-coat layer is subjected to a plasma treatment, and then the droplets of an ink is ejected onto the plasma treated hard-coat layer.

16. The method for forming an anti-glare layer of claim 13, wherein the hardcoat layer incorporates a plasticizer.

17. A method for producing an anti-glare film comprising the anti-glare layer formed on the transparent substrate by the method of claim 1.

18. The method for producing an anti-glare film of claim 17, wherein an anti-reflection layer is further provided on the anti-glare layer.

* * * * *

UNITED STATES PATENT AND TRADEMARK OFFICE
CERTIFICATE OF CORRECTION

PATENT NO. : 7,638,163 B2
APPLICATION NO. : 10/695616
DATED : December 29, 2009
INVENTOR(S) : Murakami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1452 days.

Signed and Sealed this

Ninth Day of November, 2010

David J. Kappos
*Director of the United States Patent and Trademark Office*